US012246420B2

(12) United States Patent
Mosler et al.

(10) Patent No.: US 12,246,420 B2
(45) Date of Patent: Mar. 11, 2025

(54) PLIERS

(71) Applicant: KNIPEX-Werk C. Gustav Putsch KG, Wuppertal (DE)

(72) Inventors: Mario Mosler, Leichlingen (DE); Martin Pech, Wuppertal (DE)

(73) Assignee: KNIPEX-Werk C. Gustav Putsch KG, Wuppertal (DE)

( * ) Notice: Subject to any disclaimer, the term of this patent is extended or adjusted under 35 U.S.C. 154(b) by 300 days.

(21) Appl. No.: 17/797,813

(22) PCT Filed: Feb. 9, 2021

(86) PCT No.: PCT/EP2021/053056
§ 371 (c)(1),
(2) Date: Aug. 5, 2022

(87) PCT Pub. No.: WO2021/160598
PCT Pub. Date: Aug. 19, 2021

(65) Prior Publication Data

US 2023/0074435 A1 Mar. 9, 2023

(30) Foreign Application Priority Data

Feb. 12, 2020 (DE) ..................... 10 2020 103 646.9
Feb. 2, 2021 (DE) ..................... 10 2021 102 330.0

(51) Int. Cl.
*B25B 7/10* (2006.01)

(52) U.S. Cl.
CPC ..................................... *B25B 7/10* (2013.01)

(58) Field of Classification Search
CPC .... B25B 7/02; B25B 7/04; B25B 7/06; B25B 7/10; B25B 7/12; B25B 7/14; B25B 7/18;
(Continued)

(56) References Cited

U.S. PATENT DOCUMENTS 8,695,464 B2 4/2014 Herrmann
9,370,857 B2 * 6/2016 Guenther .................. B25B 7/00
2010/0064861 A1 * 3/2010 Herrmann ................. B25B 7/10
81/409

FOREIGN PATENT DOCUMENTS

DE 39 29 323 C2 7/2001
DE 10042288 A1 * 3/2002 ............... B25B 7/04
(Continued)

OTHER PUBLICATIONS

International Search Report in PCT/EP2021/053056, mailed May 20, 2021.

*Primary Examiner* — Robert J Scruggs
(74) *Attorney, Agent, or Firm* — Collard & Roe, P.C.

(57) ABSTRACT

Pliers having two arms which cross at a pivot bolt, one of which being movable and the other being stationary, with grip sections being formed on one side of the pivot bolt, and interacting jaws being formed as the beak on the other side of the pivot bolt. The stationary arm further has a longitudinal slot with teeth, and the pivot bolt, which is located in a receptacle, is movable about the longitudinal axis thereof, counter to the force of a spring, out of engagement with the teeth into a release position and being held in the direction of the longitudinal axis with the aid of a blocking projection, which interacts with a blocking part in the receptacle. The blocking projection and the blocking part are designed to run over each other during assembly, overcoming the effect of the spring.

16 Claims, 21 Drawing Sheets

(58) Field of Classification Search
CPC ....... B25B 13/00; B25B 13/10; B25B 13/105; B25B 13/12; B25B 13/16; B25B 13/18; B25B 13/20; B25B 13/22; B25B 13/48; B25B 13/56; B25B 13/58
See application file for complete search history.

(56) References Cited

FOREIGN PATENT DOCUMENTS

| | | | |
|---|---|---|---|
| DE | 103 43 412 | A1 | 12/2004 |
| DE | 10 2007 049 032 | A1 | 4/2008 |
| DE | 10 2015 110 060 | A1 | 12/2016 |
| EP | 2 596 912 | A1 | 5/2013 |
| EP | 3 313 619 | B1 | 12/2019 |

* cited by examiner

PLIERS

CROSS REFERENCE TO RELATED APPLICATIONS

This application is the National Stage of PCT/EP2021/053056 filed on Feb. 9, 2021, which claims priority under 35 U.S.C. § 119 of German Application No. 10 2020 103 646.9 filed on Feb. 12, 2020 and German Application No. 10 2021 102 330.0 filed on Feb. 2, 2021, the disclosures of which are incorporated by reference. The international application under PCT article 21(2) was not published in English.

TECHNICAL FIELD

The invention initially pertains to pliers with two plier arms that intersect at a pivot bolt, wherein one of said plier arms is movable and the other plier arm is stationary, wherein handle sections are formed on one side of the pivot bolt and jaws interacting in the form of a beak are formed on the other side of the pivot bolt, wherein the stationary plier arm furthermore has a longitudinal slot with a toothing, and wherein the pivot bolt located in a receptacle can be moved about its longitudinal axis out of engagement with the toothing into a release position against the force of a spring and is held in the direction of the longitudinal axis with the aid of a blocking projection interacting with a blocking part of the receptacle.

The invention also pertains to pliers with two plier arms that intersect at a pivot bolt, wherein one of said plier arms is movable and the other plier arm is stationary, wherein handle sections are formed on one side of the pivot bolt and jaws interacting in the form of a beak are formed on the other side of the pivot bolt, wherein the stationary plier arm furthermore has a longitudinal slot with a toothing, and wherein the pivot bolt located in a receptacle can be moved about its longitudinal axis out of engagement with the toothing into a release position against the force of a spring.

The invention furthermore pertains to pliers with a movable plier arm and a stationary plier arm, wherein the stationary plier arm has a rigidly connected jaw, wherein a jaw that is movable on the stationary plier arm furthermore can be moved in a guided manner by means of the movable plier arm, wherein the movable plier arm furthermore interacts with a longitudinal slot that has a toothing in a separable form fit by means of a pivot bolt, which is arranged on this movable plier arm in the region of its rotational axis and has a locking tooth, in order to change the opening width of the jaws, and wherein the movable plier arm interacts with the movable jaw in a lever-like manner by means of an engagement projection, which is arranged on this movable plier arm and engages into a recess provided on the movable jaw.

PRIOR ART

Pliers of the type in question are known in different variations, e.g. in the form of a pipe wrench or water pump pliers, as well as in the form of so-called pliers wrenches or slip-joint pliers. In order to change the beak width, it is in this context known to release the tooth engagement between the toothing in the region of the longitudinal slot and the pivot bolt solely as a result of a pivoting movement about its geometric longitudinal axis and against the force of the spring in order to thereby allow a sliding movement of the movable plier arm relative to the stationary plier arm along the longitudinal slot. In this case, the tooth engagement can be released as a result of a pivoting movement of the pivot bolt about its longitudinal axis. Thusly designed pliers are known, for example, from EP 3 313 619 A1 or EP 2 596 912 A1. According to the prior art, the pivot bolt can be secured in the direction opposite to an installation inserting direction of the pivot bolt by means of a collar that forms the blocking projection and can be arranged on the pivot bolt after the installation, wherein said collar interacts with a facing outer surface of the movable plier arm surrounding the receptacle. In this case, the region of the plier arm surrounding the receptacle forms the blocking part that prevents the pivot bolt from being moved in the direction of its longitudinal axis. The collar forming the blocking projection can be separately fastened on the pivot bolt, e.g. screwed or riveted thereon. Viewed over its circumference, the collar protrudes at least partially beyond the outer contour of the pivot bolt in the region of its counter toothing.

Pliers with a jaw that can be moved on the stationary plier arm in a guided manner are known, for example, from DE 39 29 323 C2. Pliers of this type can also be referred to as so-called pliers wrenches.

DE 10 2007 049 032 A1 discloses pliers, in which the pivot bolt can in one embodiment be moved along the rotational axis in a sliding manner in order to release the tooth engagement. In this case, the pivot bolt has a driving projection with such a length that it is also captured in the driving recess in the actuated position.

DE 103 43 412 A1 discloses so-called automatic pliers, in which a pivot bolt is upon an actuation moved into a closed position against the force of a spring that directly acts between the plier arms. The pivot bolt only produces a tooth engagement against the force of the spring when an object is gripped.

We furthermore refer to DE 10 2015 110 060 A1, in which the pivot bolt can be moved out of the engaged position against the force of a spring by pivoting the plier arms, but is held in the installed position due to riveting or interlocking with a counterpart.

SUMMARY OF THE INVENTION

In light of the above-described prior art, the invention is based on the objective of improving pliers of the type in question, particularly in terms of an easy installation of the pivot bolt, while retaining high user-friendliness. With respect to pliers with a jaw that can be moved on the stationary plier arm in a guided manner, the invention aims to design such pliers advantageously in terms of handling.

According to a first inventive idea, this objective is attained with pliers, in which it is proposed that the blocking projection and the blocking part are designed for running over one another in the course of an installation, wherein the effect of the spring is overcome. An advantageous installation of the pivot bolt is achieved as a result of this design. This pivot bolt can for its installation be moved into an alignment relative to the receptacle, in which overrunning of the blocking projection and the blocking part is possible. For example, the blocking projection of the bolt can thereby run over the blocking part of the plier arm from an outer plier arm position toward an inner plier arm position in the course of an insertion process, in which the pivot bolt is essentially inserted along its longitudinal axis. The effect of the spring is suspended in the course of this installation, for example, by purposefully holding the spring in a tensioned position such that it cannot exert its force. Subsequently, the pivot bolt can be moved into the holding position, which acts in the direction of the longitudinal axis, directly or by means of a user intervention, for example, by pivoting the pivot bolt about its longitudinal axis. This return pivoting movement can be advantageously realized by releasing the spring effect. It is preferred and advantageous that the blocking projection directly forms part of the pivot bolt, wherein it is furthermore preferred that said blocking projection is realized integrally and, if applicable, uniformly in material with the pivot bolt and its counter toothing.

An advantageous installation without tools can thereby be achieved.

According to another inventive idea, the above-defined objective is potentially attained in that the receptacle is formed with a bottom on the movable plier arm.

Accordingly, the receptacle preferably is closed on one side in the axial direction. The axial depth of the receptacle is limited such that the bottom can at the same time form an axial movement hindrance for the pivot bolt in an axial direction.

In addition, the corresponding plier arm section of the movable plier arm is realized in a closed manner due to the proposed bottom design of the receptacle, wherein this can simplify, if applicable, the cleaning and care of the pliers, but optionally also an installation of the pivot bolt.

With respect to pliers with a jaw that can be moved on the stationary plier arm in a guided manner, the above-defined objective may according to another potential solution be attained in that the blocking projection is like the engagement projection essentially aligned radially to the rotational axis, and in that the blocking projection has a blocking flank that is essentially aligned radially to the rotational axis.

The movable jaw can be secured against an undesirable movement relative to the stationary plier arm due to the interaction of the additionally provided blocking projection with the movable jaw. For example, the predefined pivoting position of the movable plier arms relative to one another, in which the above-described securing is achieved as a result of the interaction of the blocking projection with the movable jaw, may be a position, in which the toothing of the pivot bolt is released from the longitudinal slot, and/or a position, in which the engagement of the engagement projection into the provided recess of the movable jaw is released. During a pivoting movement of the movable plier arm relative to the stationary plier arm into the predefined pivoting position, for example, an engagement transfer from the engagement projection interacting with the recess of the movable jaw to the blocking projection interacting with the movable jaw can furthermore be achieved such that the movability of the movable jaw on the stationary plier arm also can only be achieved together with a movement of the movable plier arm along the longitudinal slot after a potential suspension of the interaction between the engagement projection and the recess of the jaw.

In this way, the movable jaw always remains on the stationary plier arm in a captive manner regardless of the pivoting position of the movable plier arm relative to the stationary plier arm.

Furthermore, the bottom of the receptacle may be realized uniformly in material and preferably integrally with the plier arm, particularly with the movable plier arm.

In a preferred enhancement of the object of the invention, the spring can in assembled pliers prevent reaching of the installation position such that a removal of the pivot bolt is not possible during normal operation or normal handling of the pliers. Such a position, which would allow the removal of the pivot bolt, preferably is not even reached during normal handling or use of the pliers.

In fact, a separate tool preferably is required for reaching such a removal position, wherein the pivot bolt would have to be acted upon with said tool in order to overcome the spring force.

According to a potential embodiment, the receptacle may also be formed in the movable plier arm. In this case, the movable plier arm may encompass the stationary plier arm in a fork-like manner in the region of the longitudinal slot. The receptacle can only be formed in the region of a fork arm in such a fork-shaped design of the movable plier arm.

In the installed position of the pivot bolt, in particular, the blocking projection can interact with an inner surface of the receptacle facing the stationary plier arm, particularly with respect to holding the pivot bolt in the direction of the longitudinal axis. The blocking part of the receptacle accordingly provides a blocking surface for the blocking projection such that the pivot bolt is after its installation captured in the direction of the longitudinal axis, particularly opposite to the installation direction. The surface of the blocking part interacting with the blocking projection preferably lies in a concealed position, i.e. in a region that is not or not normally accessible at least during normal use of the pliers.

The receptacle preferably has an insertion opening with a widened region. This insertion opening preferably is part of the receptacle. The pivot bolt is inserted through the insertion opening essentially in the direction of the longitudinal axis in the course of the installation. In this case, the blocking projection provided on the bolt preferably can be guided through the widened region of the insertion opening in order to subsequently run over the blocking part of the receptacle. The cross-sectional area of the blocking projection viewed transverse to the longitudinal axis can be adapted to the opening area of the widened region viewed in the same plane of section. A keyhole design of sorts may thereby be realized, wherein the keyhole is formed by the insertion opening with the widened region and the key shank with the key bit is formed by the pivot bolt with the blocking projection.

The pivot bolt has to be arranged in a chosen rotational position with respect to its longitudinal axis and the extent of the longitudinal slot in order to pass through the insertion opening. This rotational position of the pivot bolt preferably does not correspond to a normal operating position of the pivot bolt while the pliers are in use. In fact, the chosen rotational position preferably is only and exclusively intended for the installation of the pivot bolt, but optionally also for a purposeful removal of the pivot bolt.

In another potential embodiment, the pivot bolt may have an elastic return element in order to prestress the pivot bolt into the tooth engagement. The elastic return element may be a spring element that is arranged on the pivot bolt and directly or indirectly acts against a supporting surface, preferably a supporting surface of the stationary arm. In this case, the supporting surface may be provided in the region of the longitudinal slot and preferably lies essentially opposite of the slot toothing.

In another embodiment, the elastic return element may comprise a pressure spring, e.g. a cylindrical pressure spring, which acts upon a separate supporting element, e.g. in the form of a ball.

In order to release the tooth engagement during a desired adjustment of the beak width, the tooth engagement has to be released by moving the pivot bolt about its longitudinal axis. This pivoting movement of the pivot bolt takes place against the restoring force of the elastic return element.

The elastic return element may be moved into a certain compressed position in the course of the passage of the pivot bolt with its blocking projection through the insertion opening with the provided widened region in the chosen rotational position of the pivot bolt. For example, this compressed position may be the position of the greatest compression possible of the return element.

This certain compressed position preferably cannot be reached during normal use of the pliers. Accordingly, it is furthermore preferred that the rotational position of the pivot bolt chosen for the passage through the insertion opening also cannot be reached during normal use of the pliers. This counteracts an inadvertent release of the latched retention of the pivot bolt on the plier arms by the user.

In addition, the pivot bolt may be accommodated in a section of the receptacle that is only partially designed in a circular manner and has a driving shoulder, which deviates from a circular extent and serves for interacting with a driving flank of the pivot bolt, wherein the pivot bolt is rotatably guided in a circular recess of the receptacle and the circular recess defines a circular line, and wherein the driving shoulder protrudes radially inward referred to the circular line and the driving flank is likewise formed within the circular line.

The driving shoulder of the pivot bolt may extend within a preferably circular contour of the pivot bolt—viewed in a plane extending perpendicular to the bolt axis.

The rotational movement of the pivot bolt for releasing the tooth engagement preferably can only be carried out deliberately. To this end, the beak is opened beyond the normal degree by means of the movable plier arm. The release of the tooth engagement is achieved solely due to a corresponding pivoting or rotatory movement of the plier arms relative to one another. No additional manual intervention by the user is required in the region of the pivot bolt.

Furthermore, the proposed design of the pivot bolt is also significant on its own regardless of the design of the pliers. In this respect, the pivot bolt can only be moved about its longitudinal axis, but not along the longitudinal axis, during normal handling.

In another embodiment, a jaw of the pliers may be designed so as to be movable relative to a plier arm, e.g. relative to the stationary plier arm. The pliers therefore may be realized, for example, in the form of a pliers wrench.

In a design of the pliers in the form of a pliers wrench, it is advantageously proposed that the blocking projection is like the engagement projection essentially aligned radially to the rotational axis, and that the blocking projection has a blocking flank that is essentially aligned radially to the rotational axis. The engagement flank of the movable jaw is arranged in such a way that it particularly prevents a movement of the movable jaw relative to the movable plier arm in and/or opposite to the direction of the stationary jaw in interaction with the blocking projection.

According to another preferred embodiment, the engagement flank may be part of a blocking recess, in which the blocking projection lies in the predefined pivoting position of the movable plier arm. A form-fitting engagement of the blocking projection in the blocking recess can be achieved in the predefined pivoting position such that the movable jaw is optionally prevented from moving relative to the movable plier arm in the direction of the stationary jaw, as well as in the opposite direction.

The predefined pivoting position of the movable plier arm relative to the stationary plier arm furthermore may correspond to the open position of the pliers. This open position of the pliers, which specifies the predefined pivoting position, also may be a position of the movable plier arm relative to the stationary plier arm, in which a release of the tooth engagement between the pivot bolt and the longitudinal slot is achieved, such that the movable plier arm can be moved along the longitudinal slot in a sliding manner together with the movable jaw in order to change the opening width of the jaws.

BRIEF DESCRIPTION OF THE DRAWINGS

The invention is described in greater detail below with reference to the attached drawings that, however, merely show exemplary embodiments. A component, which is described with reference to one of the exemplary embodiments and not replaced with a different component in another exemplary embodiment, is therefore also described as a potentially existing component in this other exemplary embodiment. In the respective drawings.

DESCRIPTION OF THE EMBODIMENTS

Figure 1:
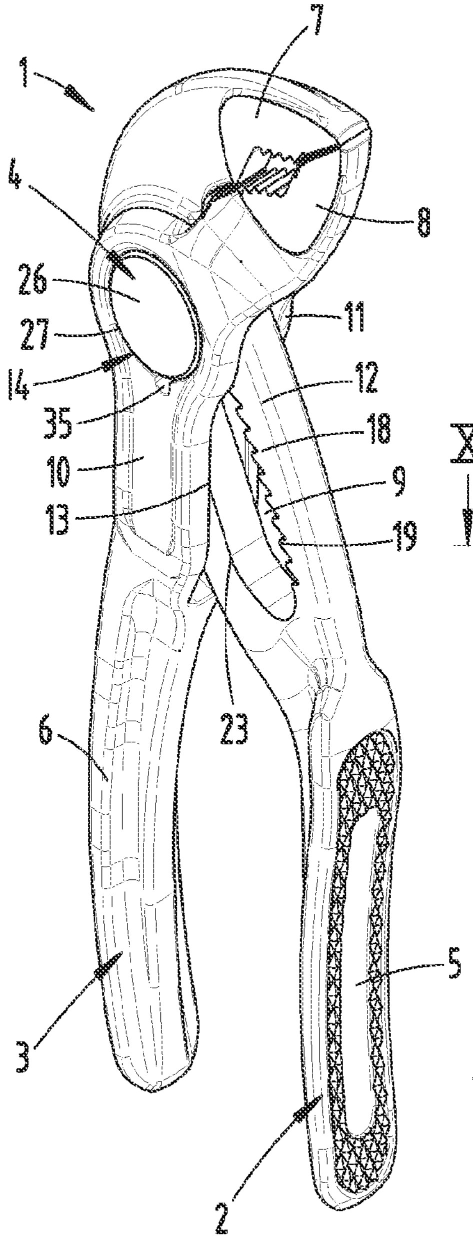
FIG. 1 shows a perspective view of pliers of the type in question concerning a first exemplary embodiment.
Figure 2:
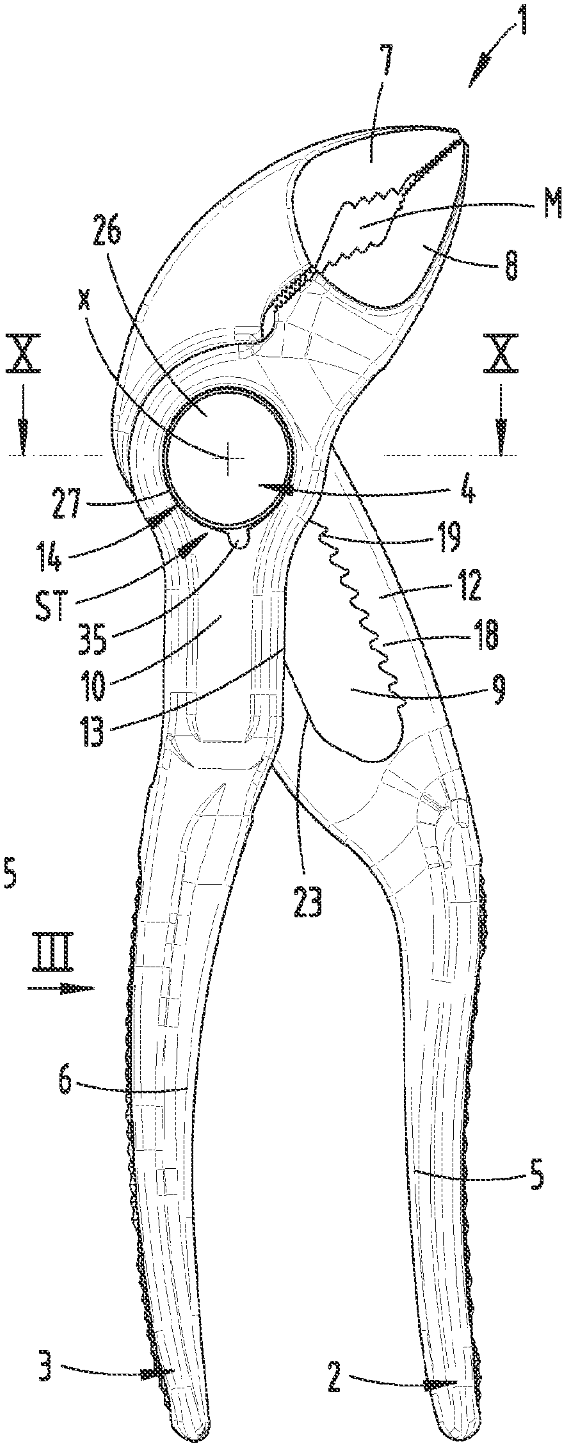
FIG. 2 shows a side view of the pliers concerning a closed beak position.
Figure 3:
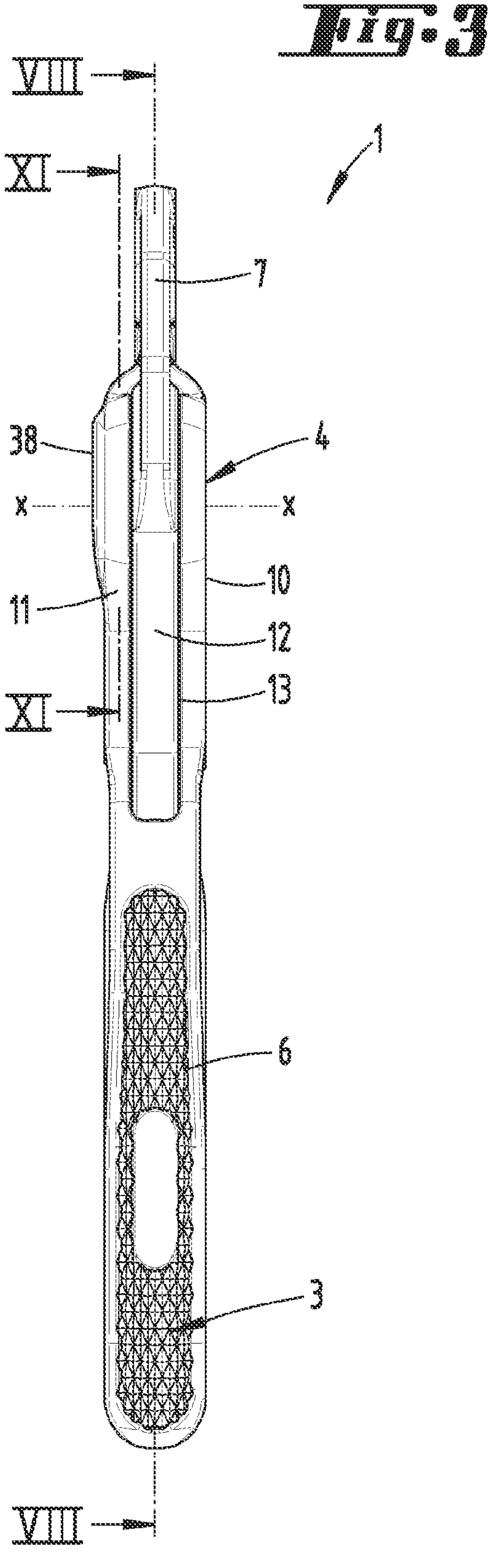
FIG. 3 shows the view according to the arrow III in FIG. 2.

Pliers 1 according to a first embodiment in the form of water pump pliers are initially described with reference to FIGS. 1 and 2.

The pliers 1 have two plier arms 2 and 3 that intersect in a pivot bolt 4, wherein the plier arm 2 is in the following description referred to as stationary plier arm and the plier arm 3 is referred to as movable plier arm. The plier arms 2 and 3 of the pliers 1 according to the first embodiment form handle sections 5 and 6 on one side of the pivot bolt 4 and jaws 7, 8, which preferably are realized integrally and uniformly in material with the handle sections 5 and 6 and define a beak M, on the other side of the pivot bolt 4.

In the second embodiment of the pliers 1 illustrated in FIGS. 15 to 25, it is preferred that only the stationary plier arm 2 is rigidly connected to the stationary jaw 7 whereas a movable jaw 8 is held on the stationary plier arm 2 such that it is linearly guided relative to the movable plier arm 3.

To this end, the arm section 12 of the stationary plier arm 2 may be realized in the form of a bearing plate with two guide grooves 40, which are respectively machined into the outer surfaces and preferably extend symmetrically to a central axis of the pliers.

Guide projections 41 of the guide section 42 of the movable jaw 8, which in this region encompasses the arm section 12 in a fork-like manner, engage into the guide grooves 40 such that the jaw 8 is held and guided on the stationary plier arm 2 like to a sliding carriage.

The sliding movement of the movable jaw 8 on the stationary plier arm 12 is achieved as a result of a pivoting movement of the movable plier arm 3. To this end, the movable plier arm 3, which encompasses the bearing plate of the stationary plier arm 2 in a fork-like manner, has on each fork section an engagement projection 43 that essentially protrudes radially to the longitudinal axis x and engages into a preferably contour-adapted recess 44 of the jaw 8 in the region of the guide section 42. In this way, the interaction between the engagement projection 43 and the recess 44 converts a pivoting movement of the movable plier arm 3 into a linear movement of the movable jaw 8 along the guide groove 40. The movable jaw 8 therefore can be respectively moved in the direction of a closed beak position or in the direction of an open beak position by means of this pivoting movement of the movable plier arm 3.

The plier arm 3 is rotatable relative to the plier arm 2 about the geometric longitudinal axis x of the pivot bolt 4 in order to change the width of the beak M formed between the jaws 7 and 8.

The stationary plier arm 2 has a longitudinal slot 9 in the intersecting region of the plier arms 2 and 3. If the pliers 1 are realized in the form of a pliers wrench as illustrated in FIGS. 15 to 25, the longitudinal slot 9 essentially extends parallel to the guide grooves 40. In the normal operating position of the pliers 1, this longitudinal slot 9 is penetrated by the pivot bolt 4, the geometric longitudinal axis x of which preferably extends perpendicular to a plane defined by the peripheral edge contour of the longitudinal slot 9.

The movable plier arm 3 preferably is designed in a fork-shaped manner in the intersecting region of the plier arms 2 and 3 and has parallel fork sections 10 and 11 that are spaced apart from one another and flank the arm section 12 of the stationary plier arm 2 with the longitudinal slot 9. The stationary plier arm 11 is inserted through the fork region 13 of the movable plier arm 3.

The pivot bolt 4 is rotatably held in the fork sections 10 and 11 of the movable plier arm 3. One fork section 10 may be provided with an insertion opening 27, which in a top view according to FIG. 2 or 16 has a circular shape, and the other fork section 11 may be provided with a pin-like centering projection 16 on its inner side, i.e. facing the arm section 12. The insertion opening 27 and the centering projection 16 are part of a receptacle 14 for the pivot bolt 4.

The pivot bolt 4 is held in the direction of the longitudinal axis x as a result of a back engagement. To this end, a blocking projection SV of the bolt interacts with a blocking part ST of the receptacle 14.

According to the exemplary embodiments shown, the blocking projection SV may in this case be designed in the form of a finger-like projection, which preferably is realized integrally and uniformly in material with the pivot bolt 4 and essentially extends in the radial direction referred to the longitudinal axis x.

The blocking part ST preferably is formed by the movable plier arm 3, particularly by the fork section 10 with the insertion opening 27. Furthermore, the blocking part ST may be formed by the plier arm surface that faces the arm section 12 and surrounds the insertion opening 27.

In the normal operating position, the pivot bolt 4 accordingly is captured in the axial direction between the fork sections 10 and 11 of the movable plier arm 3 as a result of a support in the region of the centering projection 16 on the one hand and a support of the blocking projection SV on the blocking part ST or on the facing inner wall of the fork section 10 on the other hand.

The pivot bolt 4 may have an elongate supporting formation 16, particularly in a cross-sectional plane perpendicular to the longitudinal axis x, in a region that penetrates the longitudinal slot 9 in the plier arm 2 during normal use of the pliers 1. Locking teeth 17, which are directed outward and aligned in the axial direction, may protrude beyond this supporting formation 16 in the radial direction in order to interact with a toothing 19 formed on an associated flank 18 of the longitudinal slot 9. A sliding lock of the movable plier arm 3 relative to the plier arm 2 is achieved when the locking teeth 17 are engaged with the toothing 19.

A bore 20, in which an elastic return element 21 is held, furthermore is provided on the supporting formation 16 essentially opposite of the engagement teeth 14 referred to the extent of the longitudinal axis x. This return element 21 preferably comprises a spring 22, which in the normal operating position acts against the flank 23 lying opposite of the flank 18 provided with the toothing 19 via a ball 25 that optionally lies in the bore 20 in a captive manner and protrudes beyond the surface 24 of the supporting formation 16 with the bore opening. This promotes the tooth engagement between the locking teeth 14 of the pivot bolt 4 and the toothing 19 in the region of the longitudinal slot 9.

The spring 22 may be realized, for example, in the form of a cylindrical pressure spring.

The supporting formation 16 of the pivot bolt 4 may carry a collar section 26 with the shape of a circular disk, wherein the thickness of said collar section viewed in the direction of the longitudinal axis x may essentially correspond to the material thickness of the fork section 10 viewed in the same direction. In the normal operating position, the collar section 26 guides the pivot bolt 4 in the essentially diameter-adapted insertion opening 27 in the fork section 10 rotatably about the longitudinal axis x.

In a top view, in which the longitudinal axis x is illustrated in a punctiform manner, the supporting formation 16 has segments 28 that essentially lie diametrically opposite of one another, wherein the radii of said segments referred to the longitudinal axis x essentially correspond to the radius of the collar section 26.

In a top view, the segments 28 are connected to one another by means of driving flanks 29 and 30 that essentially extend linearly.

The locking teeth 17 are formed on the driving flank 29 in the region of the supporting formation 16 penetrating the longitudinal slot 9. These locking teeth freely protrude beyond the surface of the driving flank 29.

The bore 20 accommodating the return element 21, which is composed of the spring 22 and the ball 25, preferably is provided in the region of the opposite driving flank 30.

Figure 5:
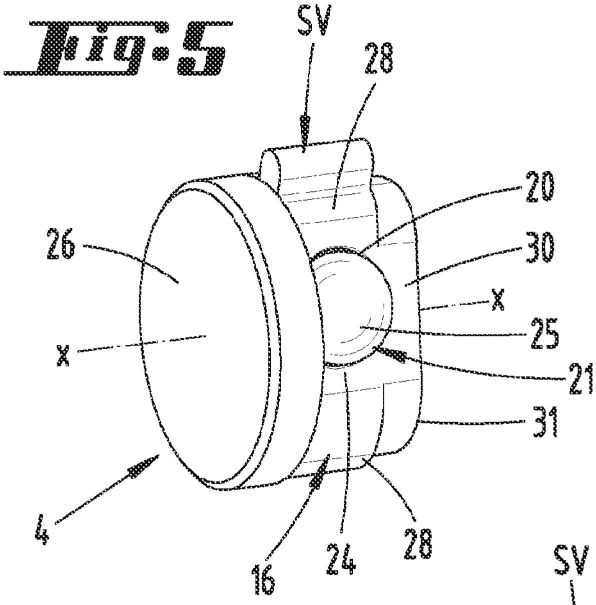
FIG. 5 shows an individual perspective view of a pivot bolt of the pliers with a blocking projection integrally formed thereon and an elastic return element.
Figure 6:
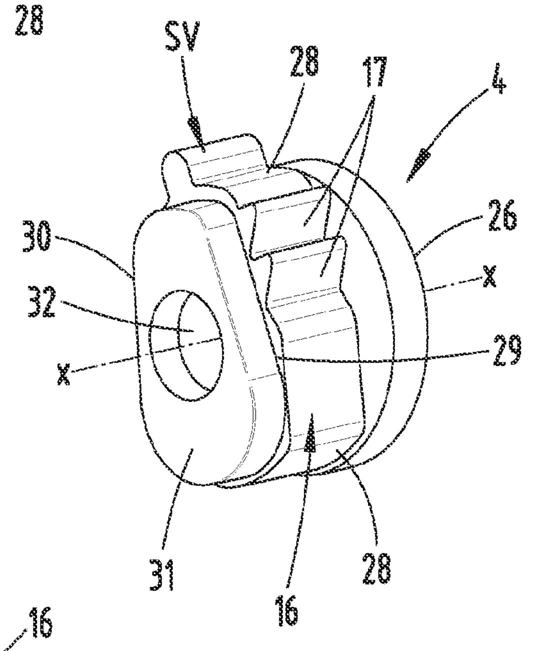
FIG. 6 shows another perspective view the pivot bolt according to FIG. 5.
Figure 7:
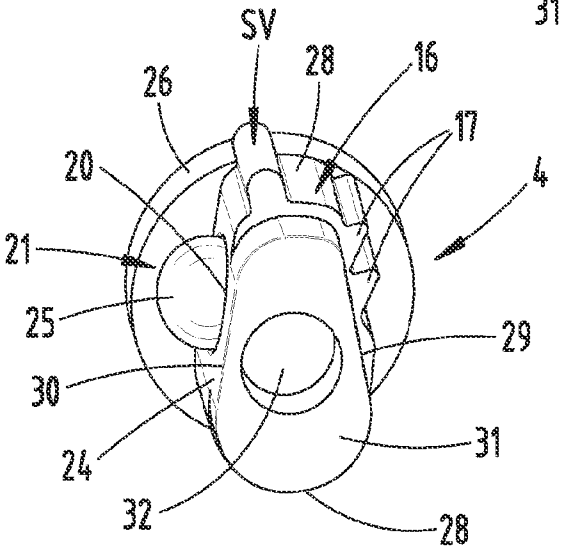
FIG. 7 shows another perspective view of the pivot bolt.

The blocking projection SV, which radially protrudes in a finger-like manner, is formed in the region of a segment 28 that connects the driving flanks 29 and 30 (compare particularly to FIGS. 5 to 7). In this case, the blocking projection SV preferably protrudes beyond the disk-like collar section 26.

All in all, the pivot bolt 4 is formed, preferably with the exception of the blocking projection SV, within an imaginary circular cylinder that accommodates the diameter of the collar section 26. It is preferred that the blocking projection SV respectively protrudes beyond the circular cylinder or beyond the collar section 26 with a protruding dimension, which approximately corresponds to one-third to one-fifth, preferably to approximately one-fourth, of the radius dimension of this imaginary circular cylinder.

The installation of the pivot bolt 4 for connecting the plier arms 2 and 3 in an articulated manner preferably takes place without tools as a result of mutual overrunning of the blocking part ST and the blocking projection SV.

Figure 4:
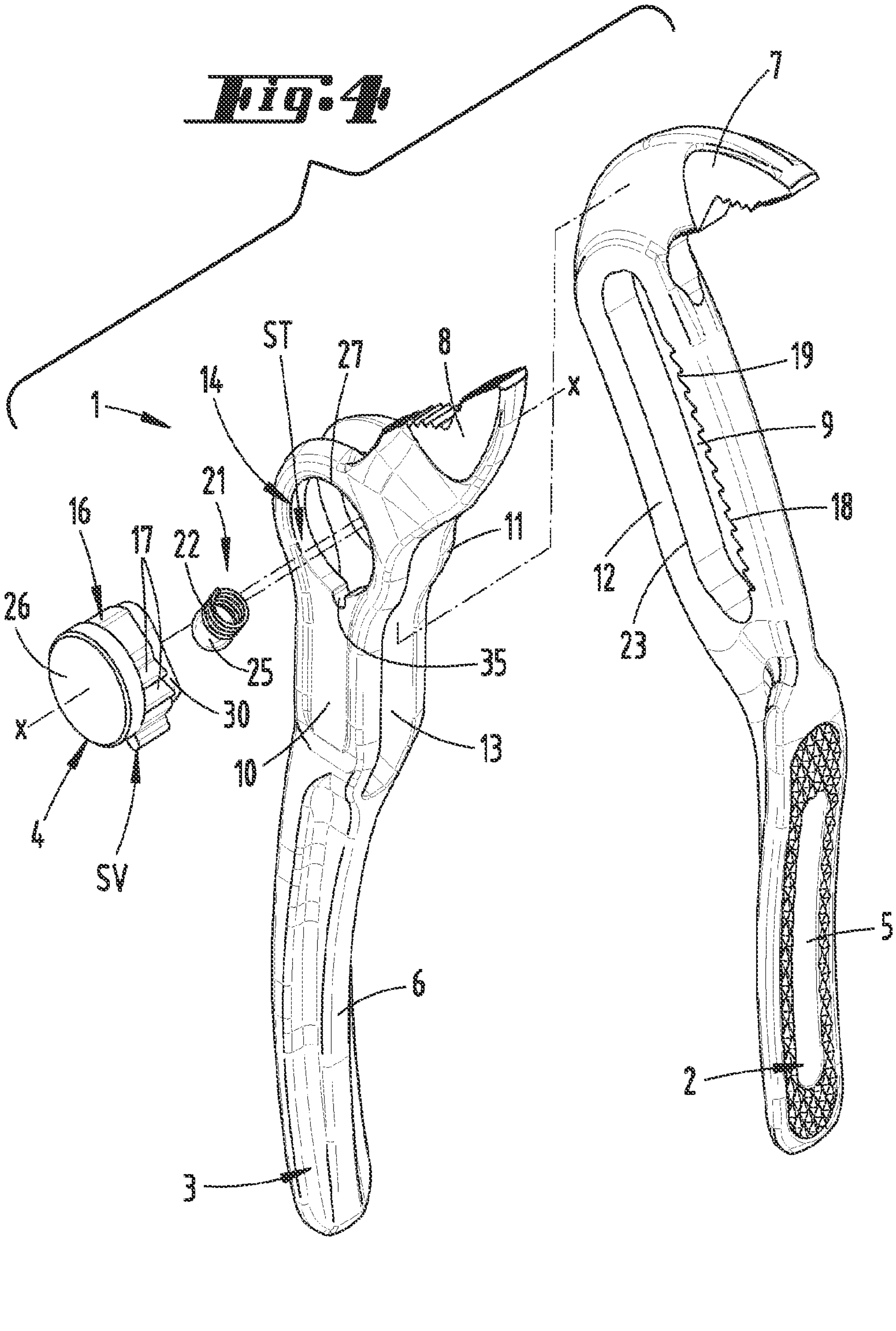
FIG. 4 shows a perspective exploded view of the pliers.

To this end, the receptacle 14 or the insertion opening 27 formed in the receptacle 14 respectively has a slot-like widened region 35 that essentially extends radially. With respect to its contour and dimensions, this widened region preferably is adapted to the blocking projection SV of the bolt in the radial direction, as well as in the circumferential direction (compare to FIGS. 4 and 8, as well as FIGS. 18 and 19). Accordingly, the blocking projection SV can pass through the widened region 35 in the direction of the longitudinal axis x.

In order to allow the passage of the pivot bolt 4 through the insertion opening 27 in the course of the bolt installation, the pivot bolt 4 initially is aligned into a chosen rotational position about its longitudinal axis x in such a way that its blocking projection SV overlaps with the widened region 35. In this case, the movable plier arm 3 has to be aligned relative to the stationary plier arm 2 with the longitudinal slot 9 in such a way that the pivot bolt 4 can be inserted through the insertion opening 27 with the widened region 35 and subsequently through the longitudinal slot 9.

Figure 8:
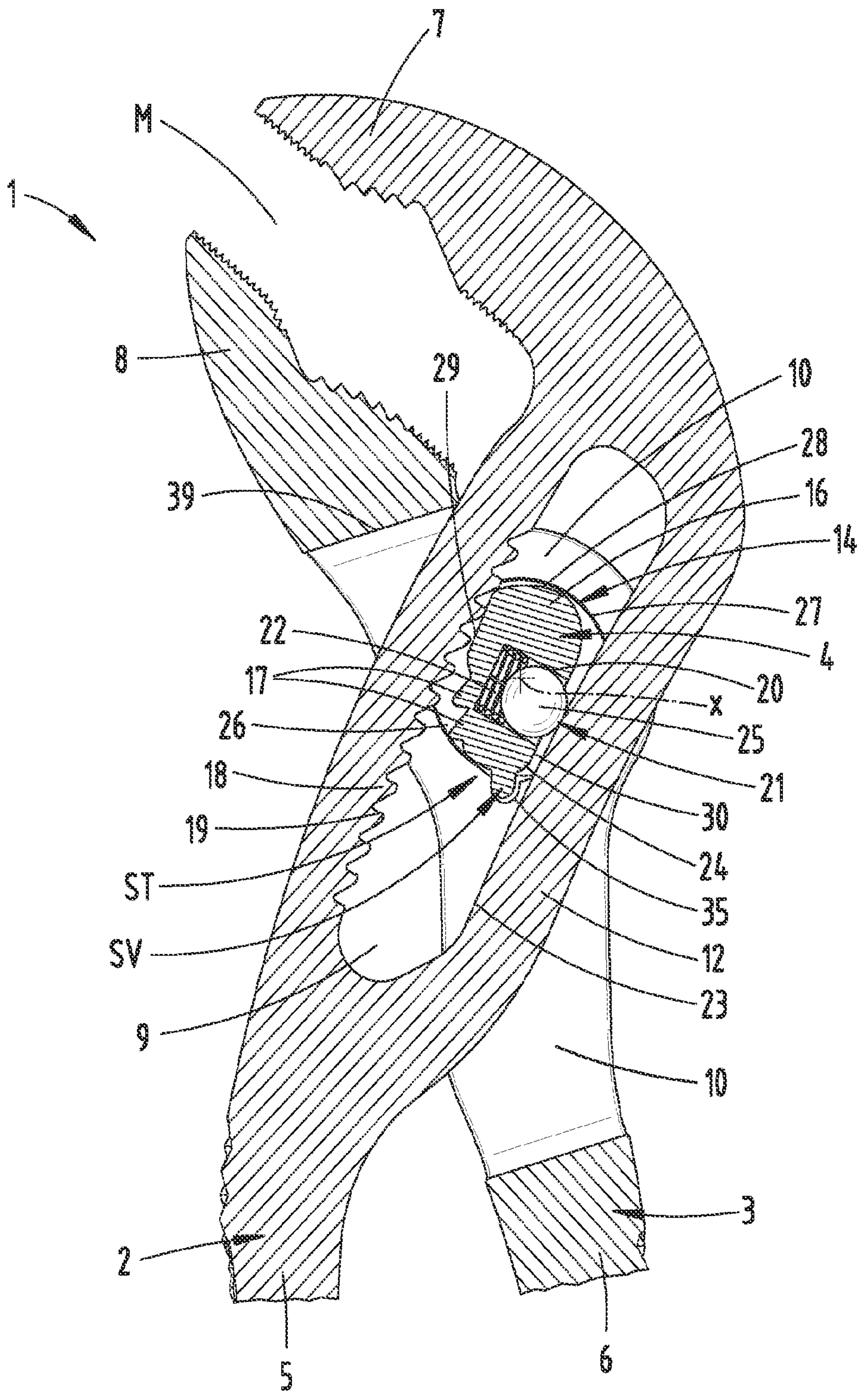
FIG. 8 shows the section according to the line VIII-VIII in FIG. 3, but concerning an intermediate position in the course of a pivot bolt installation.
Figure 19:
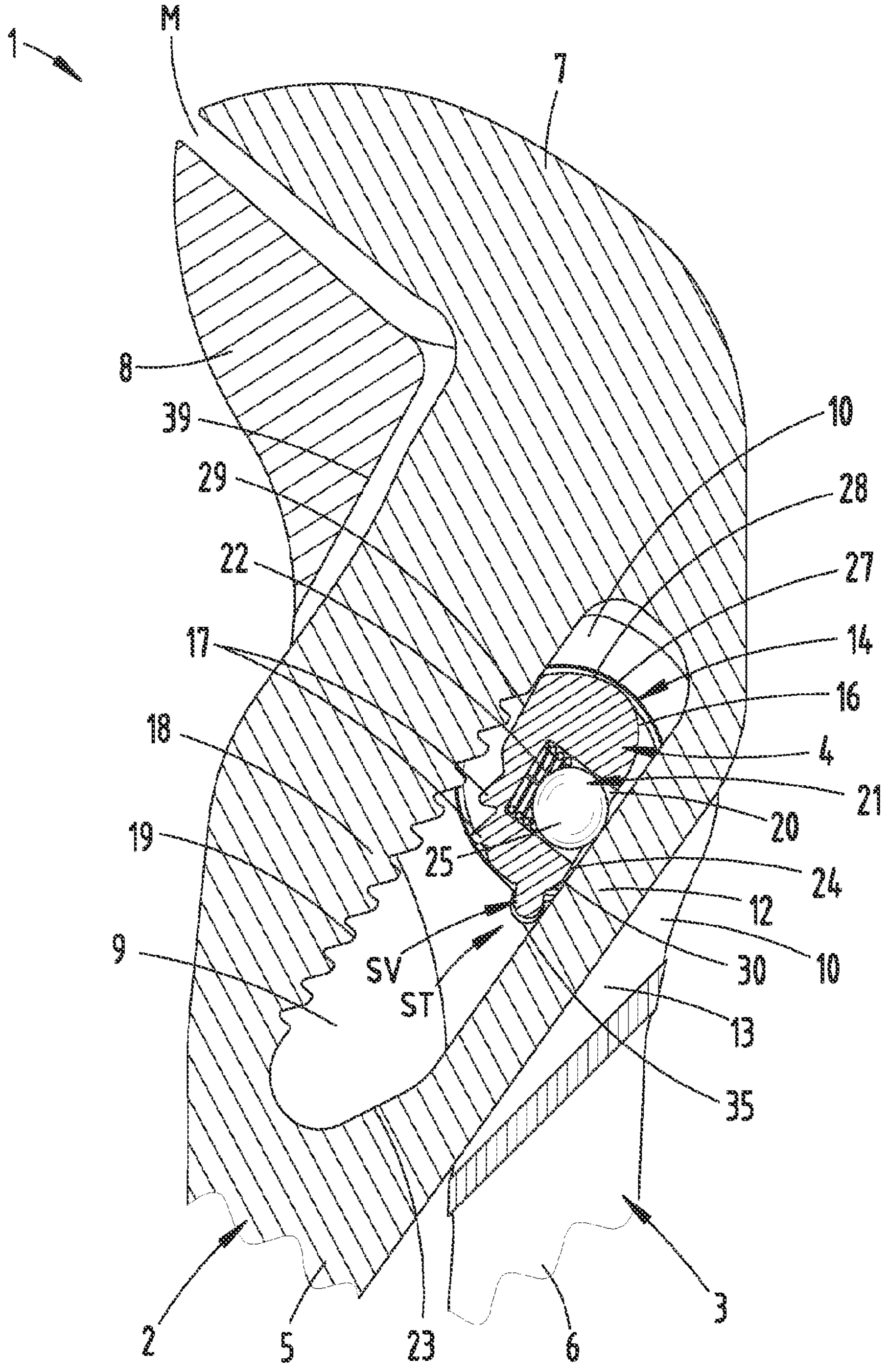
FIG. 19 shows the section XIX-XIX in FIG. 17, but concerning an intermediate position in the course of a pivot bolt installation.

In order to achieve this insertion in the course of the installation, the return element 21 of the bolt furthermore has to be manually compressed in this chosen rotational position, namely into a certain compressed position according to the respective illustrations in FIG. 8 or FIG. 19, in order to initially allow the passage through the insertion opening 27 and subsequently through the longitudinal slot 9.

Figure 9:
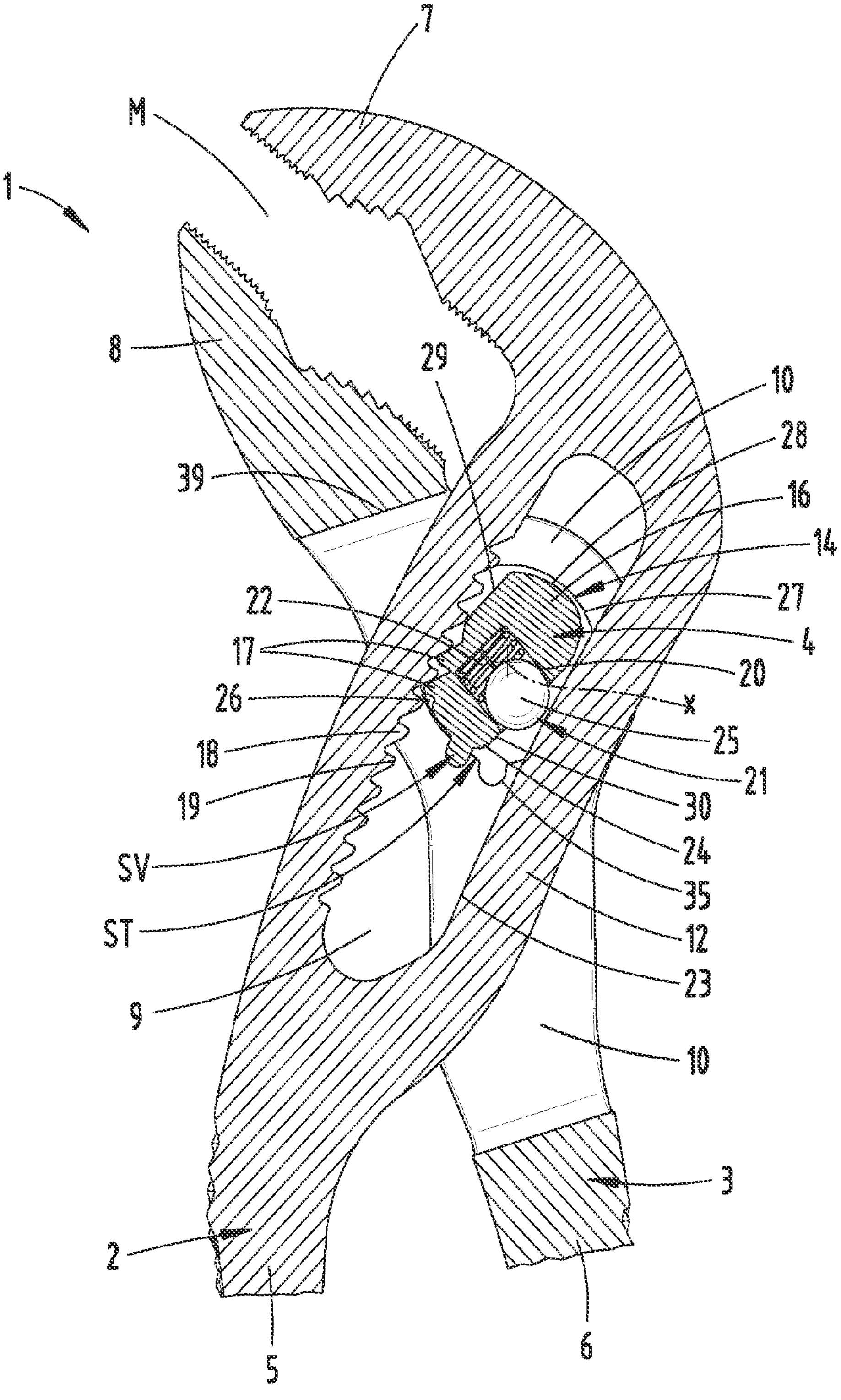
FIG. 9 shows a follow-up view to FIG. 8 concerning a position after the completion of the pivot bolt installation.
Figure 20:
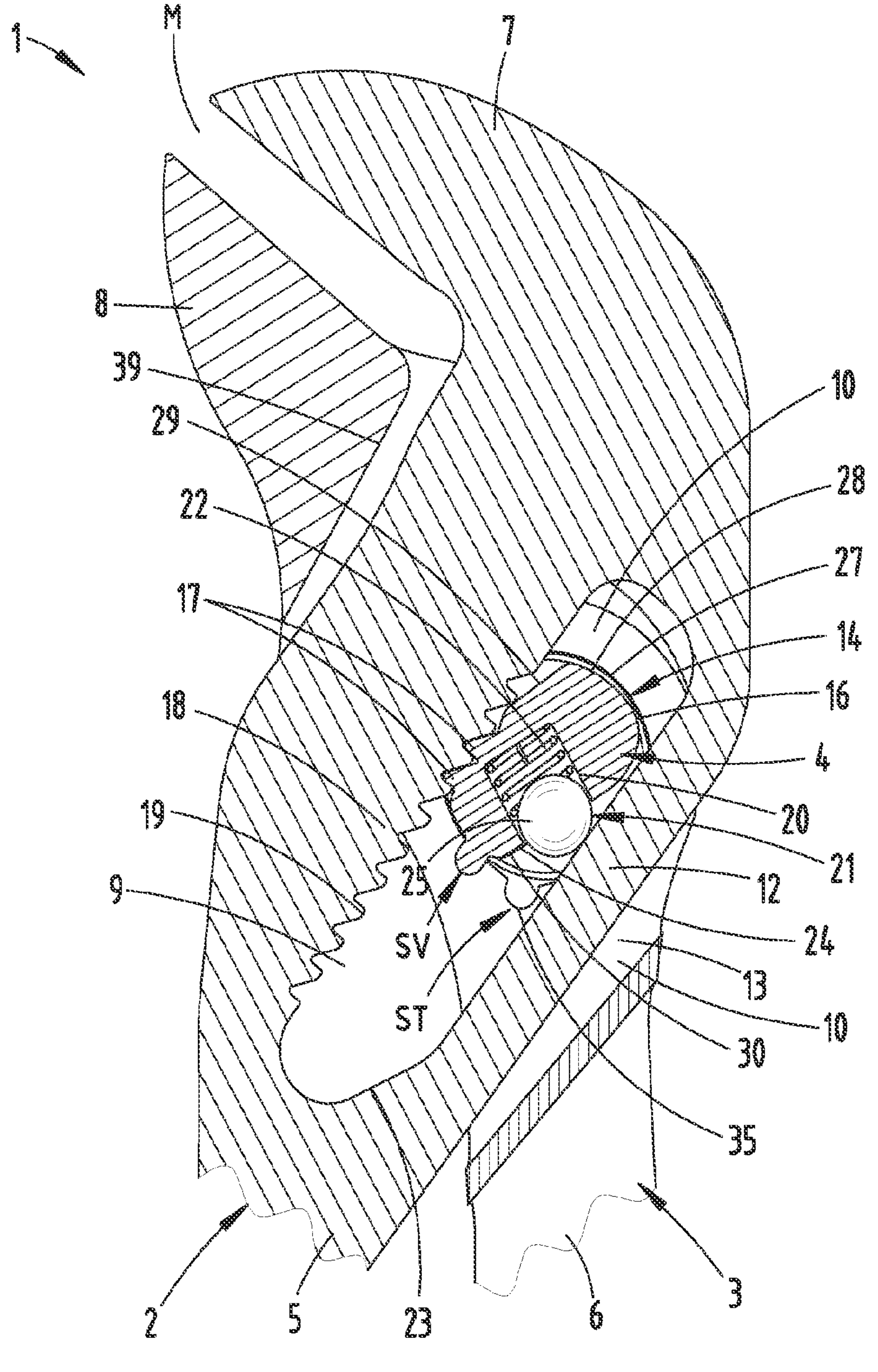
FIG. 20 shows a follow-up view to FIG. 19 concerning a position after the completion of the pivot bolt installation.
Figure 21:
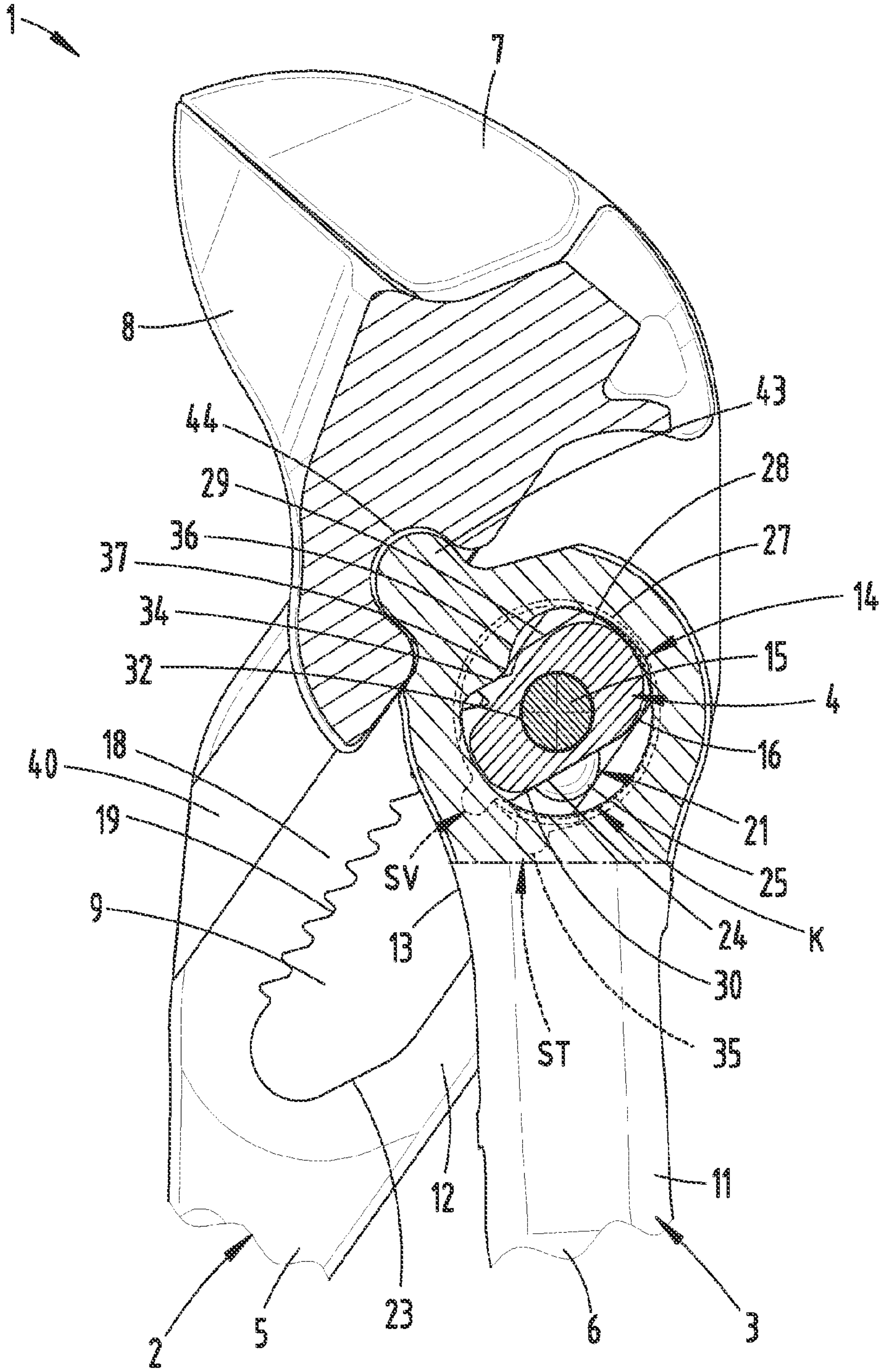
FIG. 21 shows the section along the line XXI-XXI in FIG. 17 concerning the closed beak position.

In the installation position that is stop-limited, for example, as a result of the interaction of the centering projection 15 and the depression 32 of the pivot bolt 4, the elastic return element 21 supported on the flank 18 of the longitudinal slot 9 causes a pivoting movement of the pivot bolt 4 in the direction of the tooth engagement, wherein the blocking projection SV exits the widened region 35 of the insertion opening 26 and moves in front of the surface (blocking part ST) surrounding the insertion opening 26 in a locking manner (compare to FIGS. 9 and 20). This practically results in an interlock for completing the insertion process along the longitudinal axis x.

The installation therefore preferably takes place in accordance with the keyhole principle.

The end face 31 of the pivot bolt 4 facing away from the collar section 26 may be aligned with the surface of the fork section 11 with the centering projection 15 facing away from the plier arm 2.

This bolt end face 31 preferably is provided with a central depression 32, which includes the longitudinal axis x and in which the centering projection 15 is seated in the normal operating state of the pliers 1.

The blocking projection SV and the locking teeth 17 preferably extend from the collar section 26 over only a partial length of the pivot bolt 4 viewed in the direction of the longitudinal axis x such that an end region of the pivot bolt 4, which interacts with a recess 33 surrounding the centering projection 15 and is provided with the depression 32, is defined solely by the driving flanks 29 and 30 and the segments 28.

Figure 11:
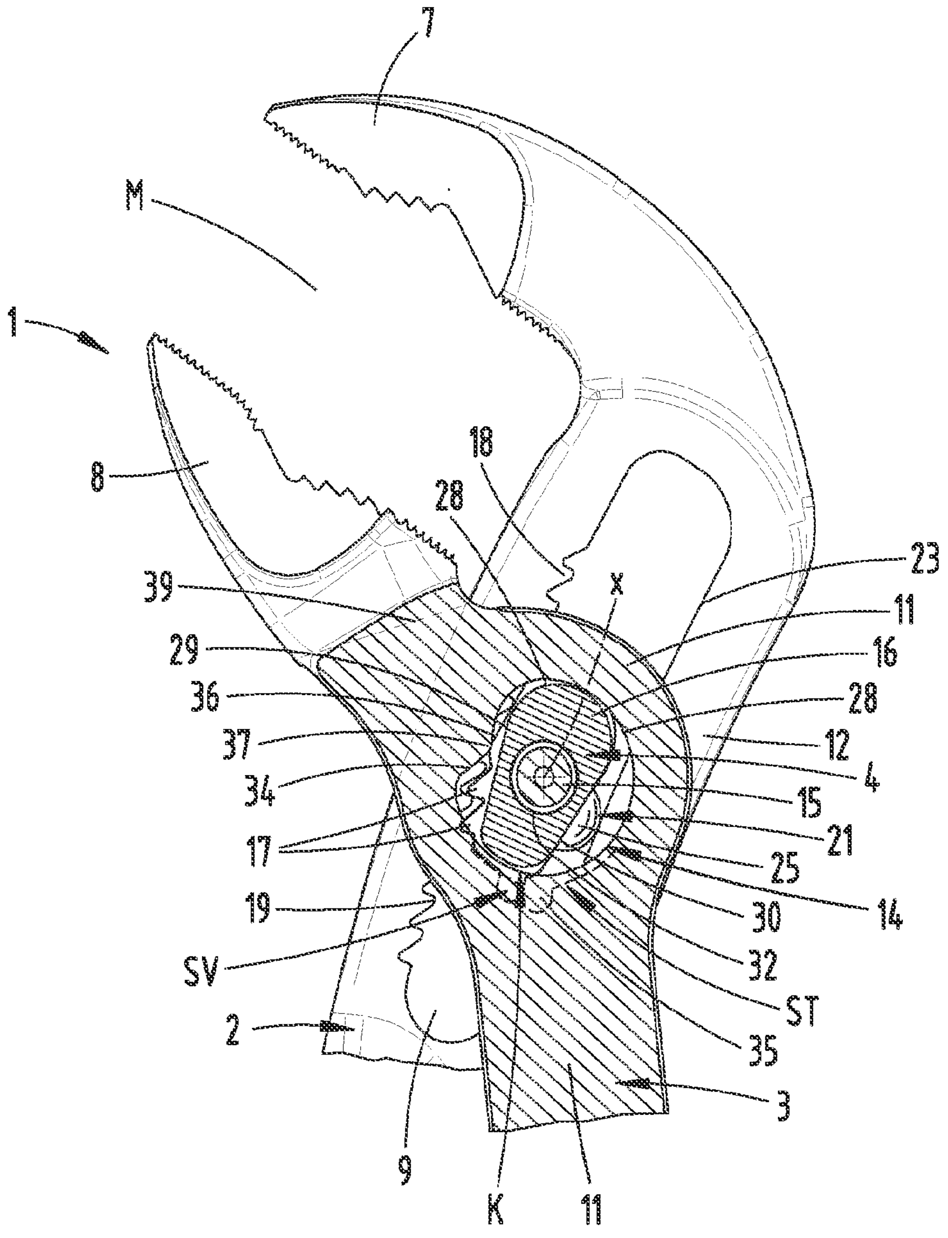
FIG. 11 shows the section along the line XI-XI in FIG. 3 concerning the closed beak position.

The recess 33 is designed open toward the arm section 12 and may with respect to a top view of the recess 33 have a contour with the shape of a circular line over approximately 270 degrees, e.g. as illustrated in FIG. 11, wherein the center of said contour lies on the longitudinal axis x. The circular line K of this contour preferably has the same or approximately the same diameter as the insertion opening 27 of the receptacle 14. The recess forms an elevation 37 that is directed radially inward over the approximately remaining 90 degrees, wherein said elevation forms an essentially linear driving shoulder 34, particularly in a region facing the driving flank 29.

The arm wall covering the recess 33 axially outward forms a bottom 38 of the receptacle 14. Accordingly, the receptacle 14 is only accessible from one side (fork section 10 with insertion opening 27).

The arrangement of the elevation 37 allows a pivoting movement of the plier arm 3 relative to the plier arm 2. In this case, the pivot bolt 4 is stationary during normal use of the pliers such that the plier arm 3 encounters a limit stop (that can be overrun) in the course of the pivoting movement into the open beak position in that the driving shoulder 34 moves against the driving flank 29 of the pivot bolt 4 (compare to FIG. 12 or 22).

Figure 10:
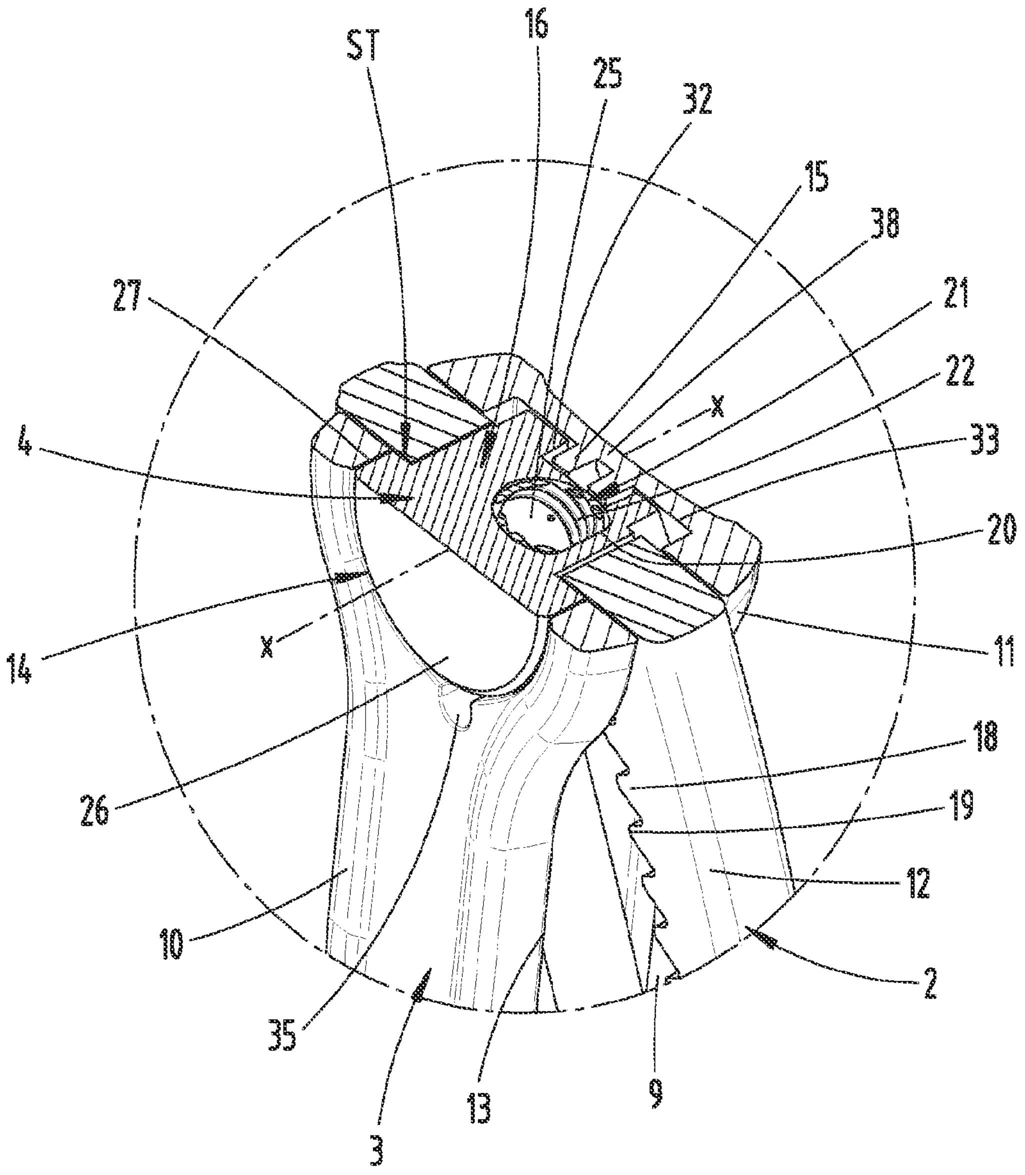
FIG. 10 shows the section according to the line X-X in FIG. 2 through the pivot bolt and an arm receptacle concerning the operational installed position of the pivot bolt.

A pivoting movement of the plier arm 3 relative to the stationary plier arm 2 about the longitudinal axis x of the pivot bolt 4 can be achieved during the tooth engagement between the locking teeth 17 of the pivot bolt and the toothing 19 in the longitudinal slot 9 (compare to FIGS. 9 to 11). During this tooth engagement, the jaws 7 and 8 accordingly can be pivoted from a closed beak position (e.g. according to FIGS. 1 to 3 and 9 to 11 or according to FIGS. 20 and 21) into an open beak position according to FIGS. 12 and 22 and vise versa.

The closed beak position preferably is stop-limited, wherein the recess 33 may for this purpose have an additional shoulder, which is circumferentially directed opposite to the driving shoulder 34 and optionally forms a stop shoulder 36, in the region of the elevation 37 forming the driving shoulder 34. The driving flank 29 of the pivot bolt 4 optionally can move against this additional shoulder in a stop-limiting manner in the closed beak position. The closed position preferably is stop-limited due to the abutment of a jaw shoulder 39, which connects the fork sections 10 and 11 in the fork region 11, on the facing narrow surface of the arm section 12 of the stationary plier arm 2 (see FIG. 11 or 21).

The tooth engagement preferably can only be released by deliberately acting thereupon, wherein the beak width can subsequently be changed as a result of a movement of the movable plier arm 3 together with the pivot bolt 4 in the longitudinal slot 9 (compare to FIGS. 13 and 14 or FIGS. 23 and 24).

Figure 12:
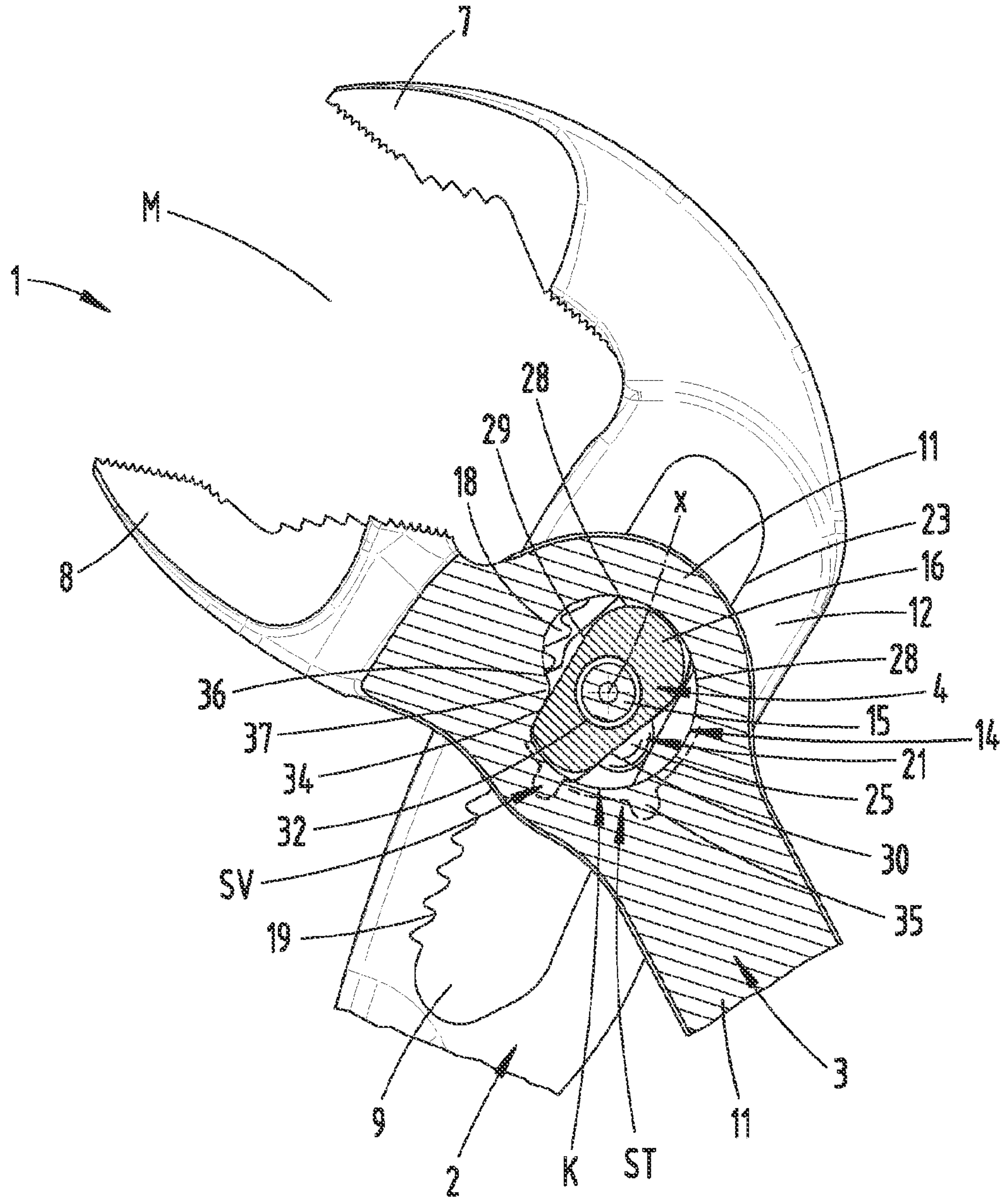
FIG. 12 shows a sectional view according to FIG. 11 concerning the open beak position.
Figure 13:
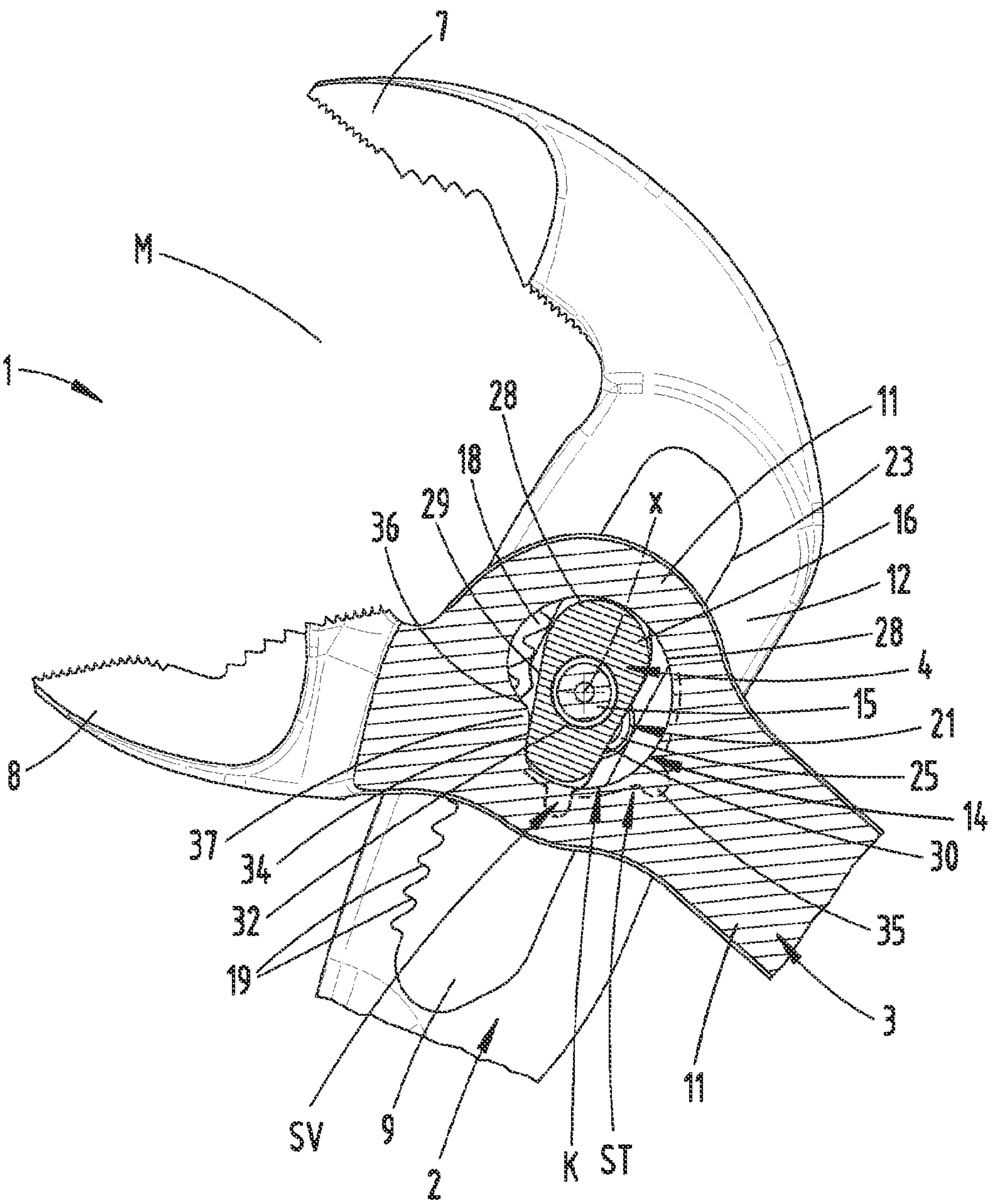
FIG. 13 shows a sectional view corresponding to FIG. 12, but concerning a pivoting position of the pivot bolt for adjusting the beak width.
Figure 22:
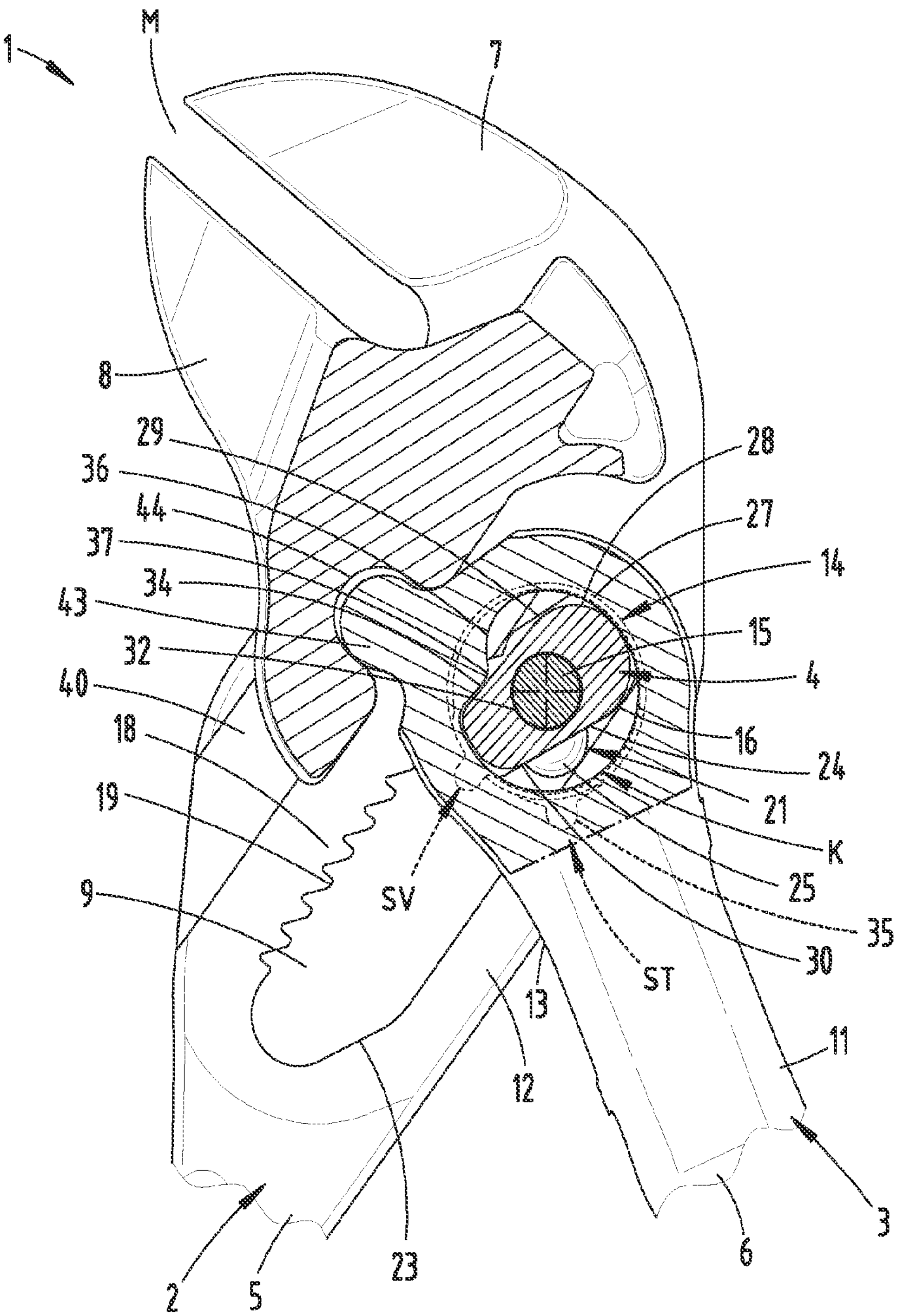
FIG. 22 shows a sectional view according to FIG. 21 concerning the open beak position.
Figure 23:
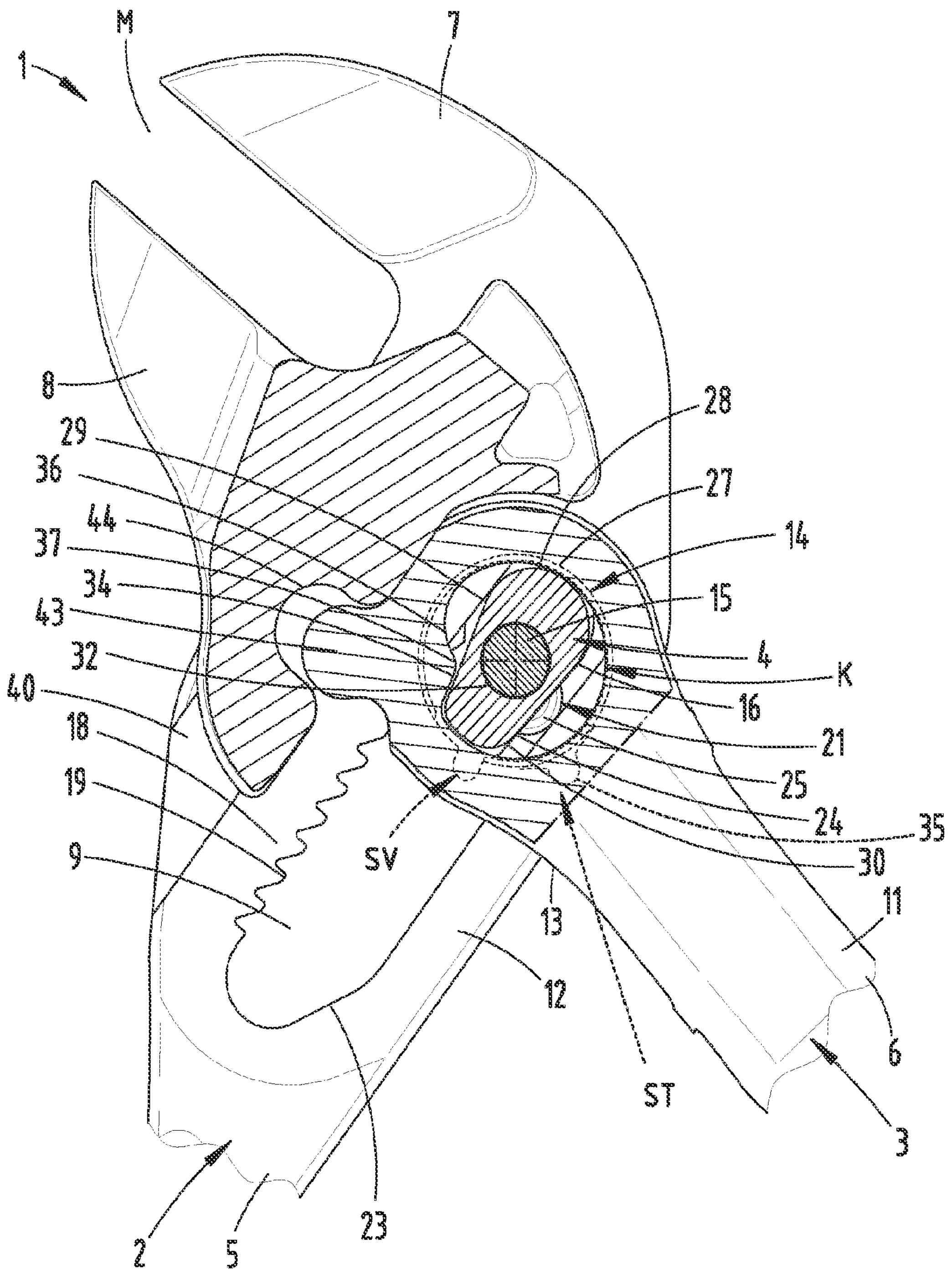
FIG. 23 shows a sectional view corresponding to FIG. 22, but concerning a pivoting position of the pivot bolt for adjusting the beak width.

In this way, the tooth engagement between the pivot bolt 4 and the longitudinal slot 9 can be disengaged from the open beak position illustrated in FIG. 12 or 22 as a result of an additional pivoting movement of the plier arm 3 (arrow a) beyond the stop-limited open beak position (compare particularly to FIG. 13 or 23). The pivot bolt 4 is dragged along by the shoulder 34 supported on the driving flank 29. This rotational disengaging movement may be stop-limited due to the abutment of the surface of the supporting formation 16 lying opposite of the locking teeth 17 on the facing flank 23 of the longitudinal slot 9.

In the course of this additional pivoting movement, the pivot bolt 4 is rotationally dragged along about the rotational axis x by means of the driving formation 30 abutting on the driving counter formation 31, wherein this leads to a pivoting movement of the locking teeth 17 out of the engaged position with the toothing 19 of the longitudinal slot 9 against the effect of the spring 18, and wherein the ball 19 is partially inserted into the bore 17 during said pivoting movement. The movable plier arm 3 can be moved along the longitudinal slot 9 in this pivoting position in order to change the beak width.

The rotational movement of the plier arm 3 beyond the open beak position for releasing the tooth engagement may take place over an angle of approximately 15 to 30 degrees. The tooth engagement preferably can be released from any latched position along the longitudinal slot 9.

The tooth engagement between the pivot bolt 4 and the toothing 19 in the longitudinal slot 9 can be restored again as a result of a return movement of the movable plier arm 3 and the associated rotational return movement of the pivot bolt 4.

Figure 14:
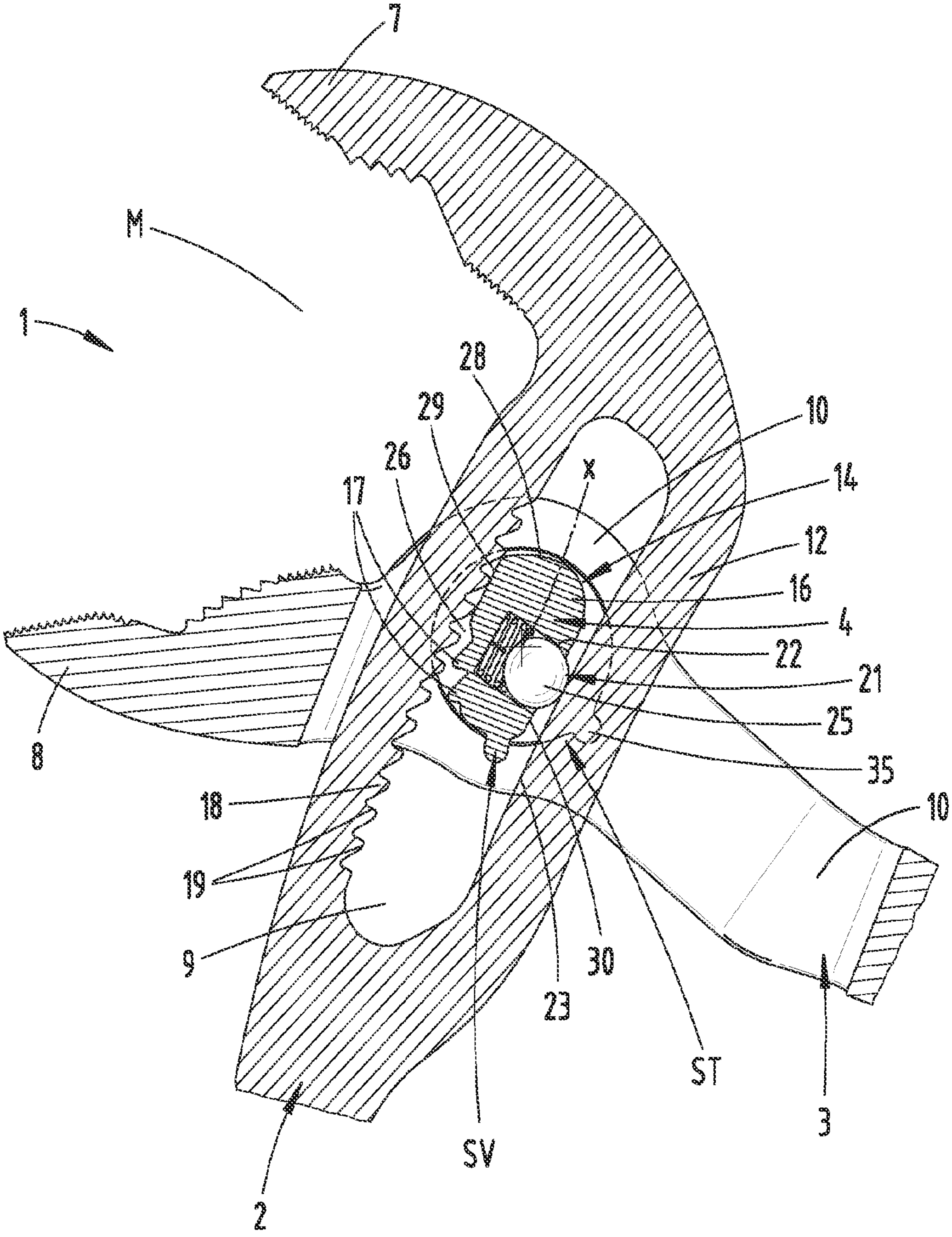
FIG. 14 shows a sectional view according to FIG. 9, but concerning the position according to FIG. 13.
Figure 15:
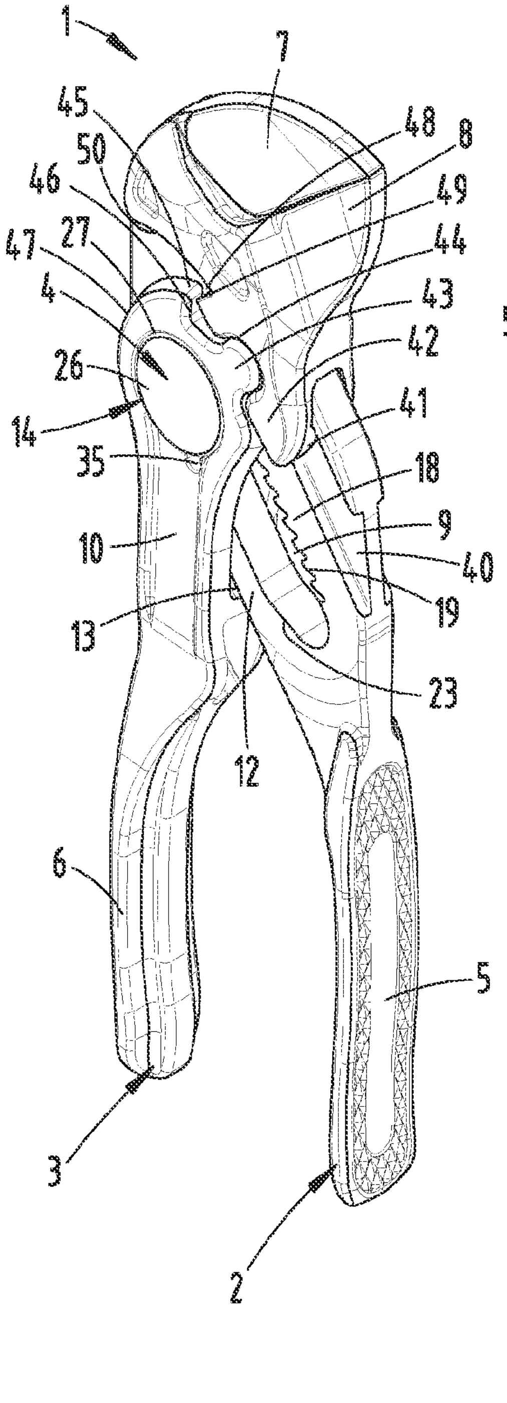
FIG. 15 shows a perspective view of the pliers concerning a second exemplary embodiment.
Figure 16:
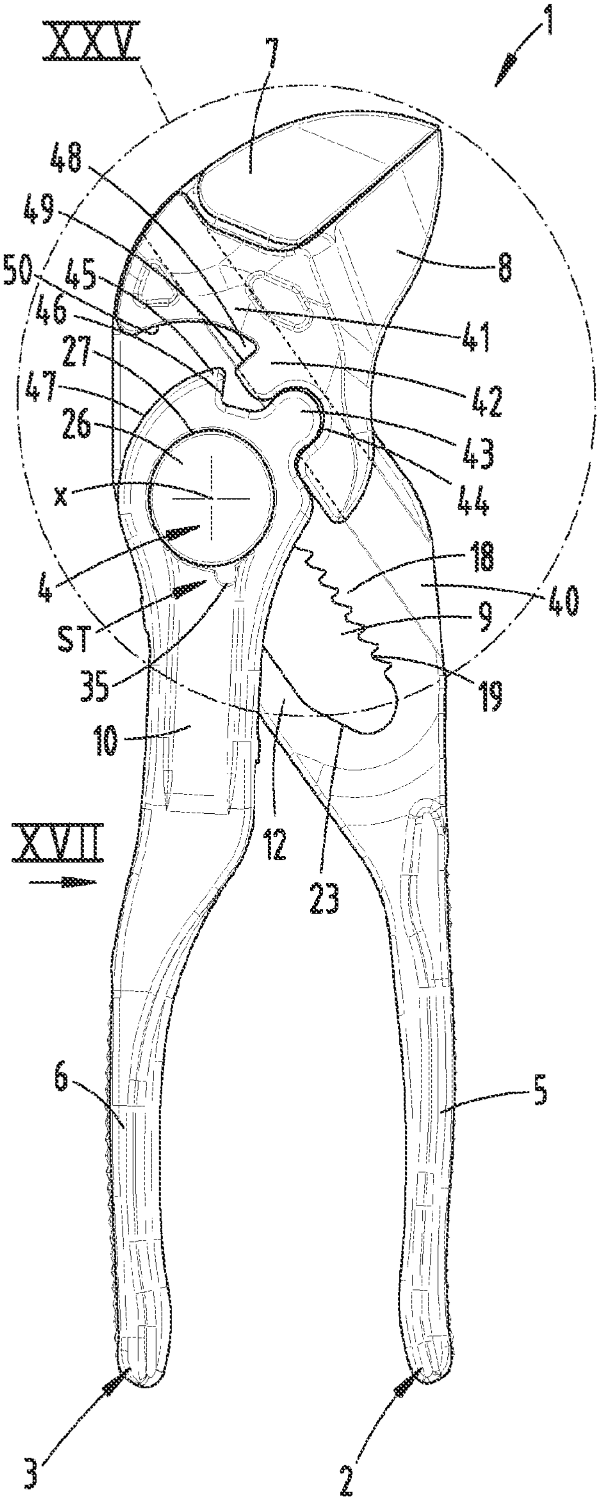
FIG. 16 shows a side view of the pliers according to FIG. 15 concerning a closed beak position.
Figure 17:
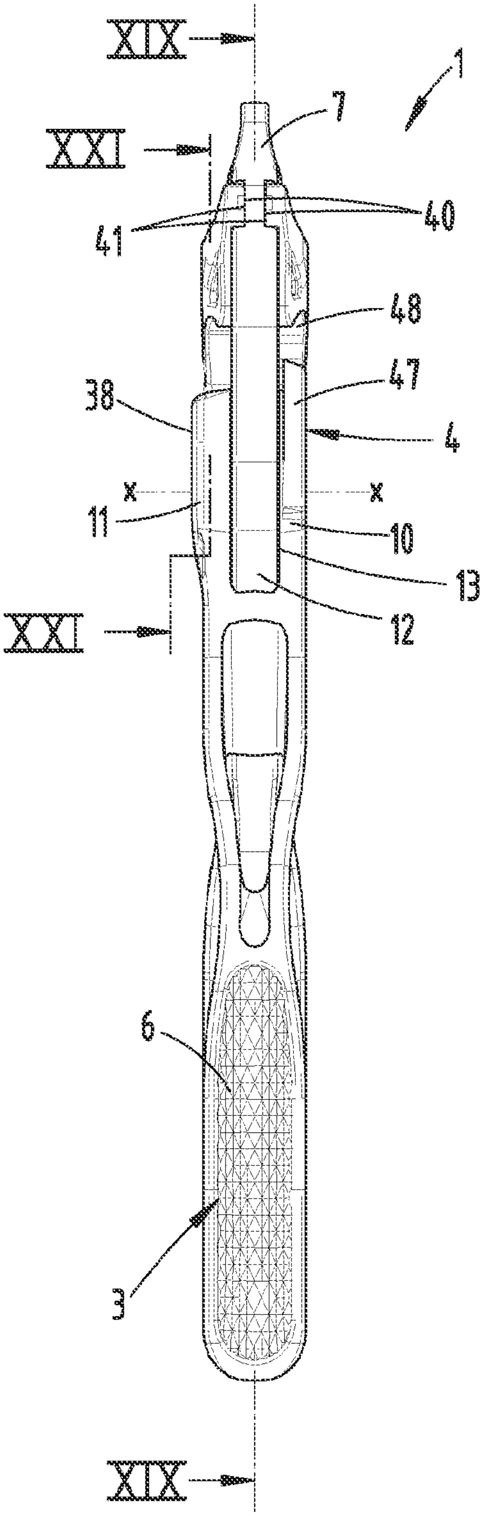
FIG. 17 shows the view according to the arrow XVII in FIG. 16.
Figure 18:
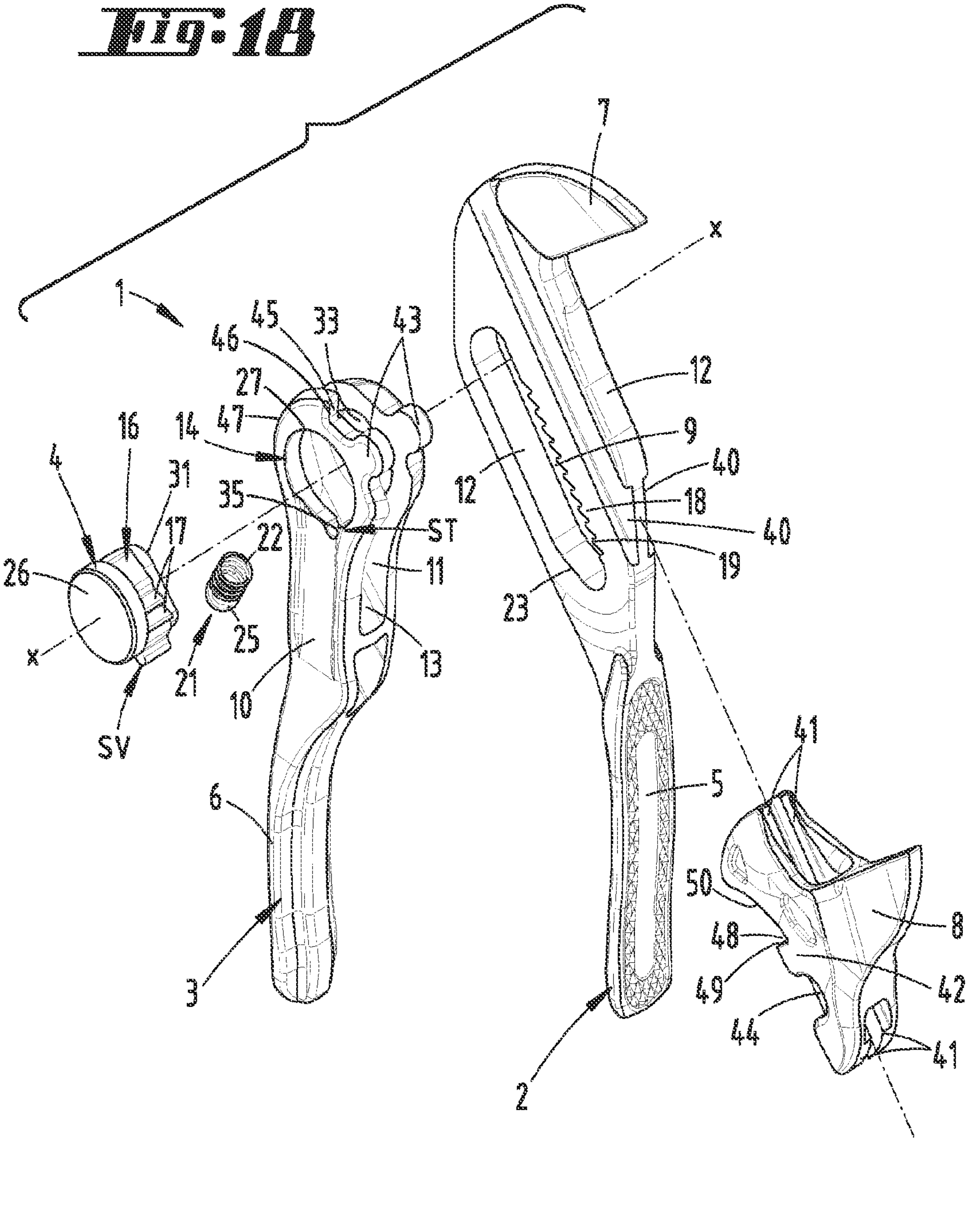
FIG. 18 shows a perspective exploded view of the pliers.
Figure 24:
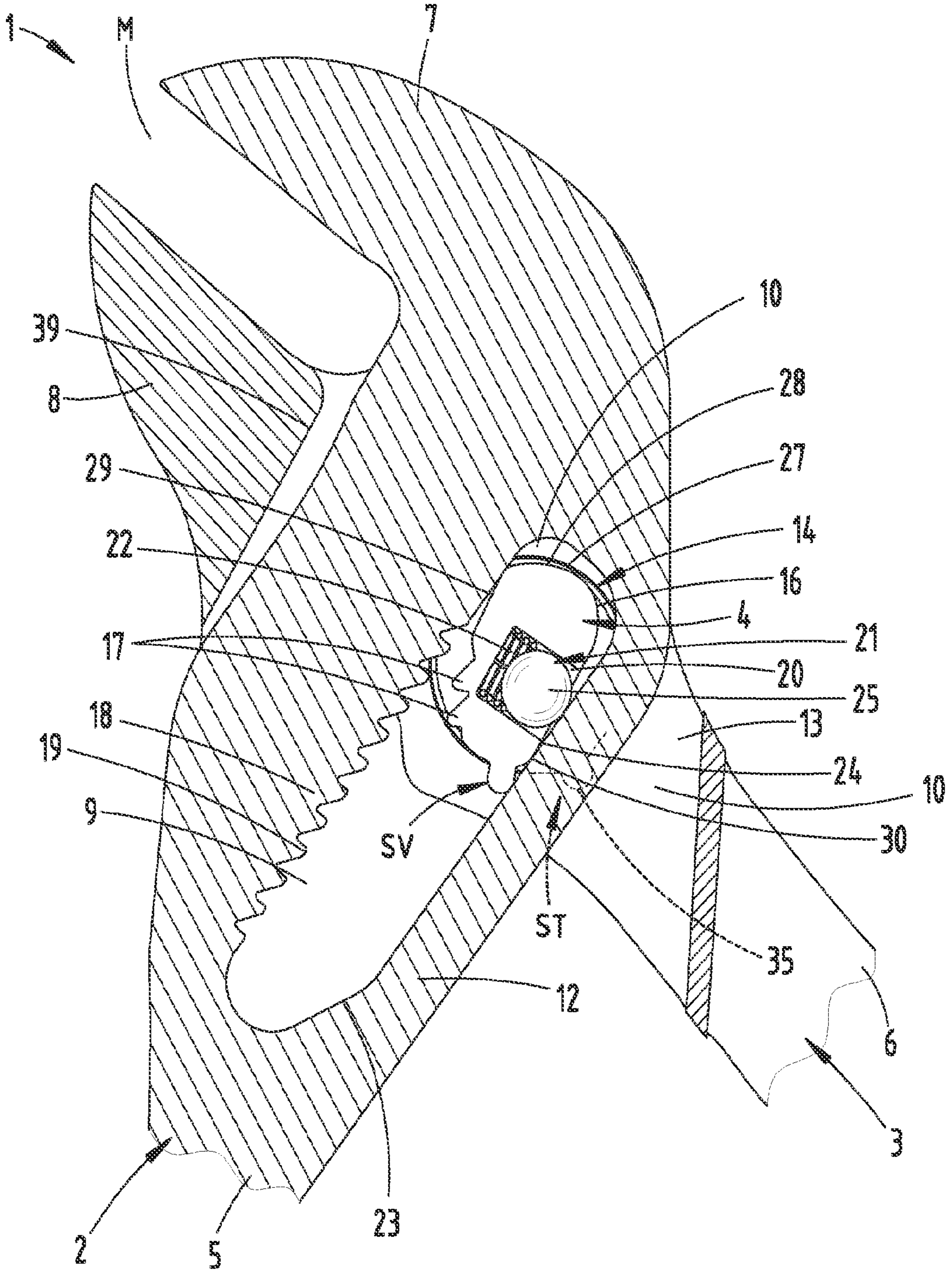
FIG. 24 shows a sectional view according to FIG. 20, but concerning the position according to FIG. 23.

According to the illustrations in FIG. 9 or 20 (closed beak position), as well as the illustrations in FIG. 12 or 22 (open beak position) and FIG. 14 or 24 (beak adjustment), the chosen rotational position for the installation of the pivot bolt 4 relative to the insertion opening 27 or the widened region 35 cannot be reached during normal use of the pliers 1. The stop-limited pivoting range of the movable plier arm 3 relative to the stationary plier arm 2 prevents the pivot bolt 4 from being dragged along into the chosen rotational position. An undesired accidental removal of the pivot bolt 4 is precluded during normal handling of the pliers 1. Removal of the pivot bolt 4 without tools is also prevented.

Figure 25:
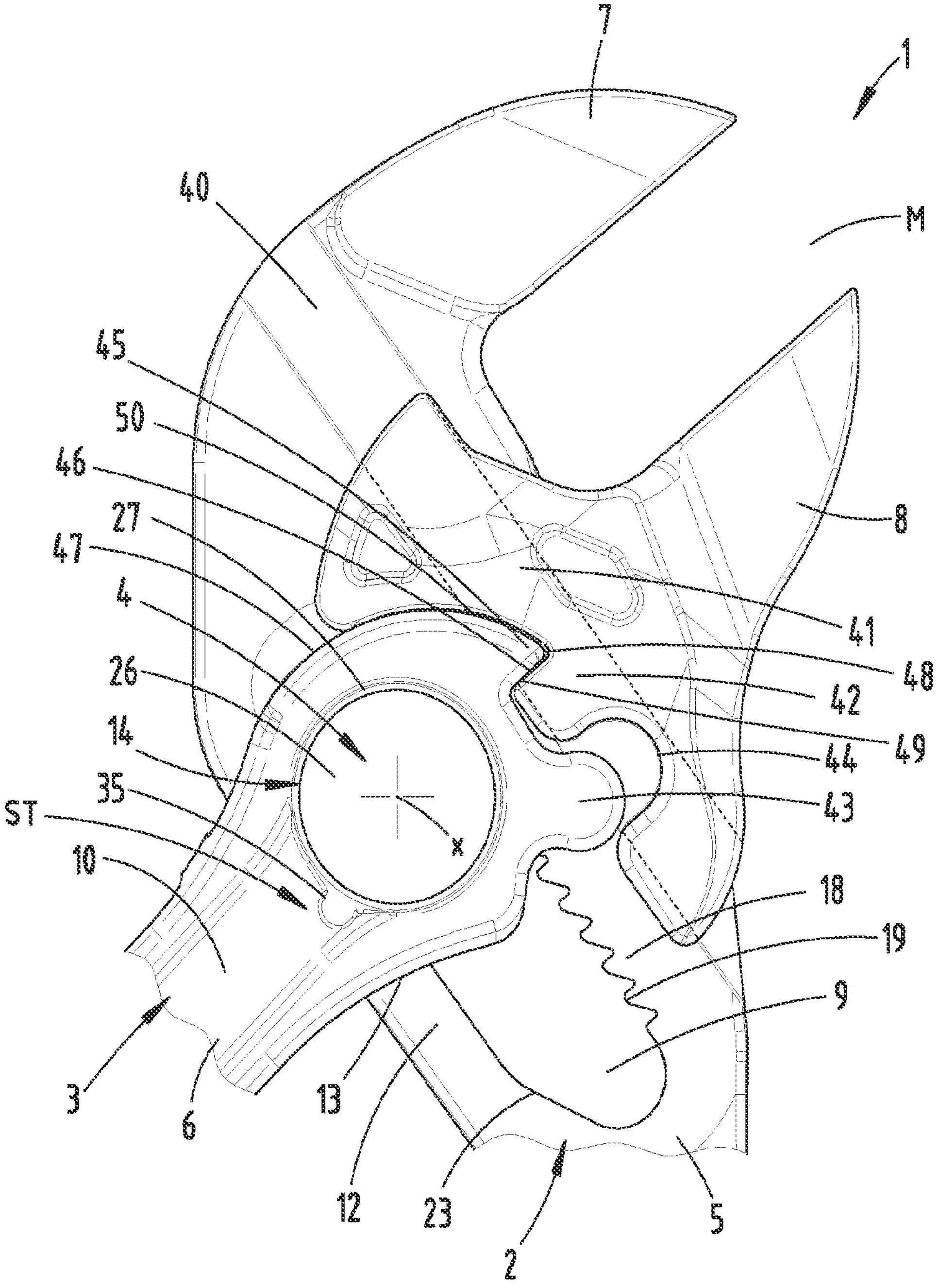
FIG. 25 shows the enlarged detail of the region XXV in FIG. 16, but concerning the position according to FIG. 23.

The enlarged detail in FIG. 25 particularly shows that, if the pliers 1 are realized in the form of a pliers wrench according to FIGS. 15 to 25, the engagement projection 43 formed on the plier arm is tendentiously moved out of the recess 44 of the movable jaw 8 in the predefined pivoting position of the movable plier arm 3, in which the beak adjustment position is reached. The movable plier arm 3 furthermore is provided with a blocking projection 45 in order to counteract a potential evasive movement of the movable jaw 8 relative to the movable plier arm 3 in this beak adjustment position.

The blocking projection 45, which like the engagement projection 43 essentially is aligned radially to the longitudinal axis x, furthermore is with respect to the longitudinal axis x of the pivot bolt 4 designed offset in the opening pivoting direction of the movable plier arm 3 at a distance from the engagement projection 43 and comprises a blocking flank 46 that essentially is aligned radially to the longitudinal axis x. The radially outer end of the blocking flank 46 may transform into a segment-shaped outer contour 47 of the region of the movable plier arm 3 surrounding the insertion opening 27.

The movable jaw 8 is provided with a blocking recess 48, which essentially is open at the edge in the direction of the movable plier arm 3, at a distance from the recess 44 in the direction of the guide groove 40. This blocking recess has an engagement flank 49, which essentially is aligned transverse to the longitudinal extent of the guide groove 40 or transverse to the sliding direction of the movable jaw 8 on the stationary plier arm 2 and preferably transforms into an essentially segment-shaped abutment flank 50 in the region of its end facing away from the longitudinal axis x of the pivot bolt 4.

It is preferred that the blocking projection 45, as well as the corresponding blocking recess 48, is only provided on one side of the movable jaw 8 that overlaps the bearing plate of the stationary plier arm 2 in a fork-shaped manner, as well as on only one side of the movable plier arm 3, particularly on the arm side that also has the insertion opening 27 for the pivot bolt 4.

With respect to the connection between the movable arm 3 and the movable jaw 8, a transfer from an interacting region between the engagement projection 43 and the recess 44 to the interacting region between the blocking projection 45 and the blocking recess 48 can be achieved in the course of the pivoting movement of the movable plier arm 3 for releasing the tooth engagement between the pivot bolt 4 and the longitudinal slot 9 in accordance with FIG. 24. In the predefined pivoting position of the movable plier arm 3, in which the tooth engagement between the pivot bolt 4 and the longitudinal slot 9 is released, the blocking projection 45 furthermore can engage into the blocking recess 48 of the movable jaw 8 and thereby prevent a movement of the movable jaw 8 relative to the movable plier arm 3. Furthermore, the blocking projection 45 optionally may act against the engagement flank 49 of the blocking recess 48 and/or the segment-shaped outer contour 47 with the preferably contour-adapted abutment flank 50 in a stop-limiting manner with its blocking flank 46.

According to the illustration in FIG. 25, a contour-adapted form fit position, which essentially fills out the blocking recess 48, can be achieved between the movable jaw 8 and the movable plier arm 3.

Consequently, the movable jaw 8 also can only be moved along the guide groove 40 in order to change the beak width together with the movable plier arm 3 in this predefined pivoting position of the movable plier arm 3.

The preceding explanations serve for elucidating all inventions that are included in this application and respectively enhance the prior art independently with at least the following combinations of characteristics, wherein two, multiple or all of these combinations of characteristics may also be combined with one another, namely:

Pliers, which are characterized in that the blocking projection SV and the blocking part ST are designed for running over one another in the course of an installation, wherein the effect of the spring 22 is overcome.

Pliers, which are characterized in that the receptacle 14 is formed with a bottom 38 on the movable plier arm 3.

Pliers, which are characterized in that the bottom 38 is realized uniformly in material with the plier arm 3.

Pliers, which are characterized in that the spring 22 prevents reaching of the installation position in assembled pliers 1.

Pliers, which are characterized in that the receptacle 14 is formed in the movable plier arm 3.

Pliers, which are characterized in that the blocking projection SV interacts with an inner surface of the receptacle 14 facing the stationary plier arm 2.

Pliers, which are characterized in that the receptacle 14 has an insertion opening 27 with a widened region 35.

Pliers, which are characterized in that the blocking projection SV can pass through the widened region 35.

Pliers, which are characterized in that the pivot bolt 4 has to be arranged in a chosen rotational position with respect to its longitudinal axis x and the extent of the longitudinal slot 9 in order to pass through the insertion opening 27.

Pliers, which are characterized in that the pivot bolt 4 has an elastic return element 21 for being prestressed into the tooth engagement.

Pliers, which are characterized in that the elastic return element 21 is moved into a certain compressed position in the course of the passage in the chosen rotational position.

Pliers, which are characterized in that the certain compressed position cannot be reached during normal use of the pliers 1.

Pliers, which are characterized in that the pivot bolt 4 is accommodated in a section of the receptacle 14 that is only partially designed in a circular manner and has a driving shoulder 34, which deviates from a circular extent and serves for interacting with a driving flank 29 of the pivot bolt 4, wherein the pivot bolt 4 is rotatably guided in a circular recess 33 of the receptacle 14 and the circular recess 33 defines a circular line, wherein the driving shoulder 34 protrudes radially inward referred to the circular line K and the driving flank 29 is likewise formed within the circular line K, and wherein the recess 33 preferably is sectionally circular.

Pliers, which are characterized in that a blocking projection 45 is formed on the movable plier arm 3, wherein said blocking projection is engaged with the movable jaw 8 in a predefined pivoting position of the movable plier arm 3 and thereby counteracts a potential evasive movement of the movable jaw 8 relative to the movable plier arm 3.

Pliers, which are characterized in that the movable jaw 8 has an engagement flank 49 that is acted upon by the blocking projection 45 in the predefined pivoting position of the movable plier arm 3.

Pliers, which are characterized in that the engagement flank 49 is part of a blocking recess 48, in which the blocking projection 45 lies in the predefined pivoting position of the movable plier arm 3.

Pliers, which are characterized in that the predefined pivoting position of the movable plier arm 3 corresponds to the open position of the pliers 1.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

| | |
|---|---|
| 1 | Pliers |
| 2 | Flier arm |
| 3 | Plier arm |
| 4 | Pivot bolt |
| 5 | Handle section |
| 6 | Handle section |
| 7 | Jaw |
| 8 | Jaw |
| 9 | Longitudinal slot |
| 10 | Fork section |
| 11 | Fork section |
| 12 | Arm section |
| 13 | Fork region |
| 14 | Receptacle |
| 15 | Centering projection |
| 16 | Supporting formation |
| 17 | Locking tooth |
| 18 | Flank |
| 19 | Toothing |
| 20 | Bore |
| 21 | Return element |
| 22 | Spring |
| 23 | Flank |
| 24 | Surface |
| 25 | Ball |
| 26 | Collar section |
| 27 | Insertion opening |
| 28 | Segment |
| 29 | Driving flank |
| 30 | Driving flank |
| 31 | End face |
| 32 | Depression |
| 33 | Recess |
| 34 | Driving shoulder |
| 35 | Widened region |
| 36 | Shoulder |
| 37 | Elevation |
| 38 | Bottom |
| 39 | Jaw shoulder |
| 40 | Guide groove |
| 41 | Guide projection |
| 42 | Guide section |
| 43 | Engagement projection |
| 44 | Recess |
| 45 | Blocking projection |
| 46 | Blocking flank |
| 47 | Outer contour |
| 48 | Blocking recess |
| 49 | Engagement flank |
| 50 | Abutment flank |
| a | Arrow |
| x | Longitudinal axis |
| K | Circular line |
| M | Beak |
| ST | Blocking part |
| SV | Blocking projection |

The invention claimed is:

1. Pliers comprising with two plier arms that intersect at a pivot bolt located in a receptacle, wherein one of said plier arms is movable and the other said plier arm is stationary, wherein handle sections are formed on one side of the pivot bolt and jaws interacting in the form of a beak (M) are formed on the other side of the pivot bolt, wherein the stationary plier arm has a longitudinal slot with a toothing, and wherein the pivot bolt is configured to be moved about its longitudinal axis (x) out of engagement with the toothing into a release position against the force of a spring and is held in a direction of the longitudinal axis (x) with the aid of a blocking projection (SV) interacting with a blocking part (ST) of the receptacle, wherein the blocking projection (SV) and the blocking part (ST) are designed to run over one another in the direction of the longitudinal axis (x) in the course of an installation of the pivot bolt to overcome the force of the spring.

2. The pliers according to claim 1, wherein the pivot bolt comprises the spring.

3. The pliers according to claim 1, wherein the receptacle is formed with a bottom on the movable plier arm, the bottom closing the receptacle on one side.

4. The pliers according to claim 3, wherein the bottom is realized uniformly in material with the plier arm.

5. The pliers according to claim 3, wherein the pivot bolt is held in the direction of the longitudinal axis (x) with the aid of a blocking projection (SV) interacting with a blocking part (ST) of the receptacle.

6. The pliers according to claim 1, wherein the spring prevents reaching of an installation position in assembled pliers.

7. The pliers according to claim 1, wherein the receptacle is formed in the movable plier arm.

8. The pliers according to claim 1, wherein the blocking projection (SV) interacts with an inner surface of the receptacle facing the stationary plier arm.

9. The pliers according to claim 1, wherein the receptacle has an insertion opening with a widened region.

10. The pliers according to claim 9, wherein the blocking projection (SV) is configured to pass through the widened region.

11. The pliers according to claim 10, wherein the pivot bolt is configured such that the pivot bolt must be arranged in a chosen rotational position with respect to its longitudinal axis (x) and an extent of the longitudinal slot in order to pass through the insertion opening.

12. The pliers according to claim 11, wherein the pivot bolt has an elastic return element configured for being prestressed into the tooth engagement.

13. The pliers according to claim 12, wherein the elastic return element is configured to be moved into a certain compressed position during passage of the bolt in the chosen rotational position.

14. The pliers according to claim 13, wherein the certain compressed position cannot be reached during normal use of the pliers.

15. The pliers according to claim 1, wherein the pivot bolt is accommodated in a section of the receptacle that is only partially designed in a circular manner and has a driving shoulder, which deviates from a circular extent and is configured for interacting with a driving flank of the pivot bolt, wherein the pivot bolt is rotatably guided in a circular recess of the receptacle and the circular recess defines a circular line (K), and wherein the driving shoulder protrudes radially inward relative to the circular line (K) and the driving flank is formed within the circular line (K).

16. The pliers according to claim 15, wherein the recess is sectionally circular.

* * * * *